US012599963B2

(12) United States Patent
Neumann et al.

(10) Patent No.: US 12,599,963 B2
(45) Date of Patent: Apr. 14, 2026

(54) CHANNELED HARDFACING WEAR PROTECTION INCORPORATING MATRIX COMPOSITE AND HARD ELEMENTS

(71) Applicant: Innovative Mechanical Solutions, LLC, Houston, TX (US)

(72) Inventors: Omar Tyson Oliver Neumann, Spring, TX (US); Alex Iain Belcher, Spring, TX (US)

(73) Assignee: Innovative Mechanical Solutions, LLC, Houston, TX (US)

( * ) Notice: Subject to any disclaimer, the term of this patent is extended or adjusted under 35 U.S.C. 154(b) by 1147 days.

(21) Appl. No.: 17/552,881

(22) Filed: Dec. 16, 2021

(65) Prior Publication Data

US 2022/0219234 A1     Jul. 14, 2022

Related U.S. Application Data

(60) Provisional application No. 63/135,058, filed on Jan. 8, 2021.

(51) Int. Cl.
| | |
|---|---|
| *B22F 7/06* | (2006.01) |
| *B22F 5/00* | (2006.01) |
| *B22F 5/10* | (2006.01) |
| *B29L 31/04* | (2006.01) |

(52) U.S. Cl.
CPC ................. *B22F 7/06* (2013.01); *B22F 5/10* (2013.01); *B22F 2005/001* (2013.01); *B29L 2031/04* (2013.01)

(58) Field of Classification Search
None
See application file for complete search history.

(56) References Cited

U.S. PATENT DOCUMENTS

| | | | |
|---|---|---|---|
| 2003/0084894 A1* | 5/2003 | Sung ...................... | B24D 7/066 |
| | | | 451/533 |
| 2011/0011965 A1* | 1/2011 | Mirchandani ......... | C22C 1/1068 |
| | | | 428/221 |
| 2015/0290771 A1* | 10/2015 | Li ........................... | B24D 3/06 |
| | | | 51/297 |
| 2021/0146433 A1* | 5/2021 | Shuck .................. | B23K 35/304 |

* cited by examiner

*Primary Examiner* — Xiaobei Wang
(74) *Attorney, Agent, or Firm* — Quisenberry Law PLLC; C. Dale Quisenberry

(57)     ABSTRACT

Methods of making composite articles wherein at least a portion of a hardsurface wear protection applied to a composite article includes matrix composite and hard elements with channels between the hard elements. A layered preform coating mat may be applied over a substrate of the composite article and then fused thereto to form channels between hard elements in the coating mat. The channels may extend over the entire outer surface of the composite article or only over a portion thereof. A hybrid layered preform coating mat may include a depressed section adapted for receiving a perforated braze preform inlay. When the coating mat is fused to the substrate, channels may be formed between the hard elements in the depressed section, but not in a non-depressed section.

17 Claims, 15 Drawing Sheets

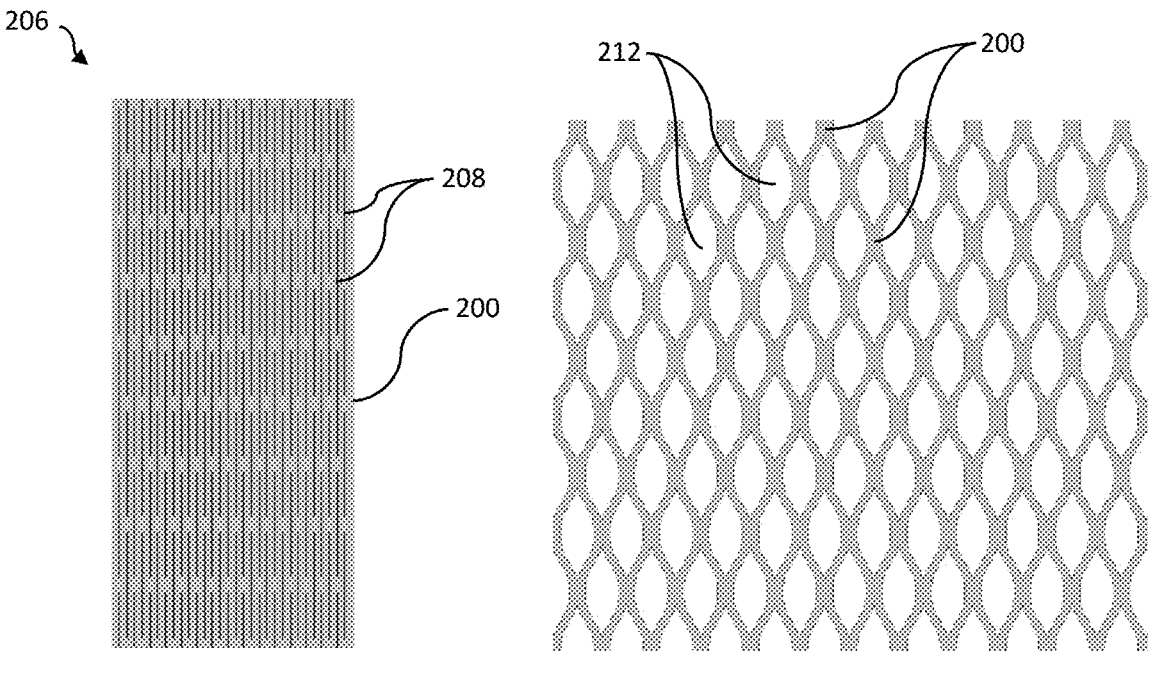
Figure 23A                                    Figure 23B
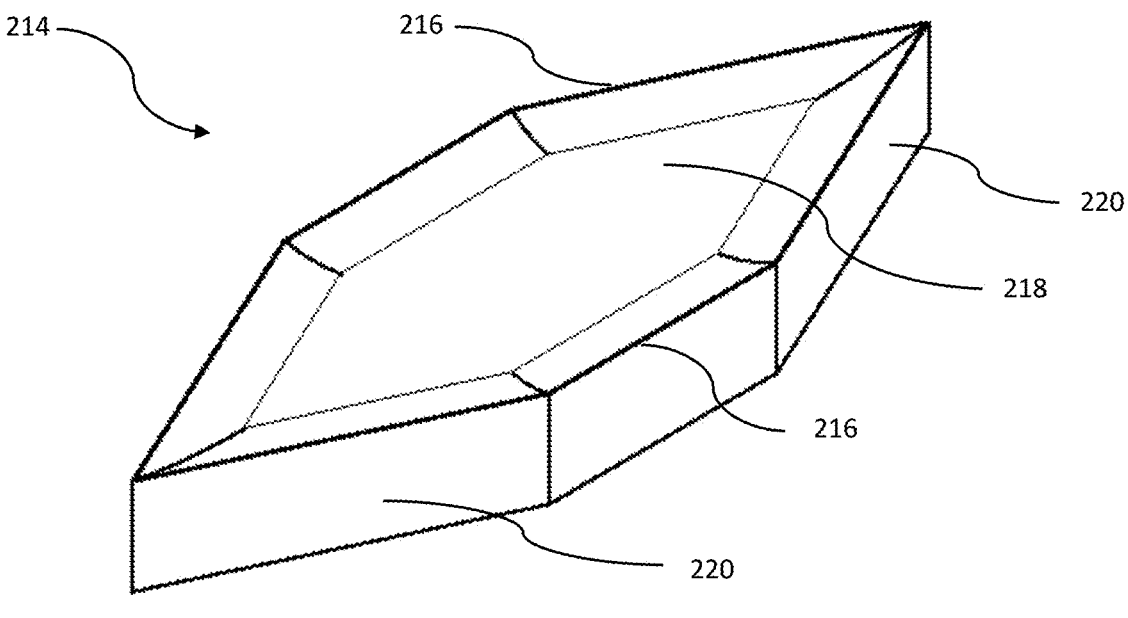
Figure 24

CHANNELED HARDFACING WEAR PROTECTION INCORPORATING MATRIX COMPOSITE AND HARD ELEMENTS

RELATED APPLICATIONS

This application claims the benefit of U.S. Provisional Application No. 63/135,058, filed Jan. 8, 2021, the contents of which are fully incorporated herein by reference.

BACKGROUND OF THE INVENTIONS

1. Field of the Inventions

The present inventions generally pertain to hardfacing wear protection, and more particularly to hardfacing wear protection incorporating matrix composite and hard elements with integrated channeling.

2. Description of the Related Art

Hardfacing wear protection has the purpose of providing a surface with wear resistant properties. Those familiar in the art will recognize that the most common type of hardfacing is a matrix composite comprising of an alloy material with fine and/or ultrafine tungsten carbide particles dispersed within it and the matrix composite fused to the substrate material of the surface to be protected. Another common wear resistant surface has relatively large hard elements arrayed and fused in place with matrix composite or braze alloy to provide additional wear resistance to the surface. In the most common manufacturing method, the hard elements are located on the hard surface manually, and then tacked in place metallurgically before the matrix composite or braze alloy is applied using brazing, plasma transfer arc welding, or laser welding or a similar process to complete the hardfacing. Other methods use induction heating to fuse the hard elements and matrix composite in place, but they each require sacrificial forms and can only be used in particular configurations (for example a flat surface is not possible).

Channeled hardfacing wear protection has the purpose of providing a surface with wear resistant properties with the added purpose of providing channels for fluid circulation, improved lubrication, and improved cooling of the hardfacing materials. In each case above the hardfacing process cannot include the channeling of the hardsurface with the application of the hardfacing itself. The only means of channeling the hard facing is post fusion finishing by means of extensive and expensive grinding or machining; the channel pattern cannot be optimized to be focused solely on the matrix composite between the hard elements; and the ability to create a fine or precise channel pattern is extremely difficult.

There remains a need for a channeled hardfacing that contains hard elements with matrix composite that has the channels formed prior to finish machining or finish grinding of the component in a cost-effective, customizable manner.

SUMMARY OF THE INVENTIONS

The present inventions described herein overcome many of the deficiencies of previous art listed above and provides the following benefits: (1) channels in the hardfacing are created at the time of fusion rather than mechanically added in post fusion processing; (2) the channels only exist where the less abrasion resistant matrix composite occur in the hardfacing; (3) the hard elements that provide the strongest material for the hardfacing do not have their surface area coverage affected by the channeling; (4) the scale of the channel pattern can be easily controlled by changing the sizes and distributions of the hard elements and the preforms; (5) channeling distribution can be easily controlled such that preselected surfaces of the hardfacing can contain channels, and other surfaces can contain no channels; (6) components making up the hardfacing are pre-assembled before being applied to the part, a process that can be automated more easily than being assembled on the finished part; (7) the parts can be fused in large batches instead of individually; (8) does not require any sacrificial parts or additional machining processing as compared to some other methods; (9) results in a very high hard particle density and homogeneous distribution in matrix composite; (10) improved accuracy on post fusion surface finish which results in reduced finish grinding time of part; (11) base layer ensures metallurgical bond to substrate with a matrix composite and/or fused alloy located on the underside of the hard elements, reduces stresses in the hardfacing, and provides crack mitigation; (12) the positioning of the hard elements are not disturbed in the process when using vacuum brazing which will result in a more cosmetically pleasing product; (13) does not need to have a cavity in which to cast the hardsurface unlike many other methods; and (14) the hard elements are not degraded by the fusion process because the local fusion temperatures are not as high and are more controlled.

In one aspect, the present inventions may include a method of making a channeled composite article comprising: creating a plurality of preforms including at least a base layer preform, a perforated hard particle preform including a plurality of cavities, and a perforated braze preform including a plurality of cavities corresponding to the cavities in the perforated hard particle preform; assembling on a flat surface the base layer preform, the perforated hard particle preform, the perforated braze preform, and hard elements into a layered preform coating mat; applying the layered preform coating mat to a substrate with the base layer preform of the layered preform coating mat disposed adjacent the substrate; and fusing the layered preform coating mat to the substrate with braze from the perforated braze preform, thereby forming channels between the hard elements over at least a portion of the layered preform coating mat. Another feature of this aspect of the present inventions may be that the method may further include adding a nonperforated braze preform to the layered preform coating mat on top of the perforated braze preform before fusing the layered preform coating mat to the substrate. Another feature of this aspect of the present inventions may be that the plurality of cavities in the perforated hard particle preform may be aligned with the plurality of cavities in the perforated braze preform, and the hard elements are positioned within the aligned cavities. Another feature of this aspect of the present inventions may be that upper surfaces of the hard elements may be generally flush with an upper surface of the perforated braze preform before the layered preform coating mat is fused to the substrate. Another feature of this aspect of the present inventions may be that upper surfaces of the hard elements may be generally projected above the upper surface of the perforated braze preform before the layered preform coating mat is fused to the substrate. Another feature of this aspect of the present inventions may be that upper surfaces of the hard elements may be generally recessed below the upper surface of the perforated braze preform before the layered preform coating mat is fused to the substrate. Another feature of this aspect of the present inventions may be that the entire surface of the layered preform coating mat includes channels between the hard elements after the layered preformed coating mat is fused to the substrate. Another feature of this aspect of the present inventions may be that materials from the layered preform coating mat that are fused to the substrate consist of at least one of hard elements, hard particles, metallic particles, and ceramic particles. Another feature of this aspect of the present inventions may be that the layered preform coating mat is fused to the substrate with braze from the perforated braze preform using one of (a) a vacuum furnace, (b) vacuum induction heating, and (c) laser heating. Another feature of this aspect of the present inventions may be that the method may further include post fusion heat treating the substrate and fused layered preform coating mat. Another feature of this aspect of the present inventions may be that the composite article is a radial bearing. Another feature of this aspect of the present inventions may be that the hard elements are one of tungsten carbide tiles and polycrystalline diamond solid. Another feature of this aspect of the present inventions may be that the hard particle preform layer includes a plurality of hard elements disposed in a pattern with a hard particle preform located between and partially filling the space around the hard elements to define a plurality of channels between the hard elements. Another feature of this aspect of the present inventions may be that the substrate is cylindrical. Another feature of this aspect of the present inventions may be that the base layer preform is formed of at least one of fine or ultrafine metallic particles, and fine or ultrafine ceramic or cermet particles, the particles being held together with a fibrillated polymer. Another feature of this aspect of the present inventions may be that creating the hard particle preform includes applying alternating cuts to a preform material, and expanding the cut preform material to form cavities to receive the hard elements. Another feature of this aspect of the present inventions may be that creating the perforated hard particle preform and the perforated braze preform includes using the hard elements as punches to perforate the perforated hard particle preform and the perforated braze preform. Another feature of this aspect of the present inventions may be that the layered preform coating mat further includes a second preform layer disposed between the base layer preform and the depressed hard particle preform layer.

In another aspect, the present inventions may include a method of making a partially channeled composite article comprising: creating a plurality of preforms including at least a base layer preform, a depressed perforated hard particle preform including a plurality of cavities and a depressed section, a perforated braze preform inlay including a plurality of cavities corresponding to a portion of the cavities in the depressed perforated hard particle preform and adapted to be received within the depressed section of the depressed perforated hard particle preform, and an unperforated braze preform having an opening corresponding to the depressed section and the perforated braze preform inlay; assembling on a flat surface the base layer preform, the depressed perforated hard particle preform over the top of the base layer preform, the perforated braze preform inlay in the depressed section of the depressed perforated hard particle preform, and the hard elements into the corresponding cavities into a hybrid layered preform coating mat; applying the hybrid layered preform coating mat to a substrate with the base layer preform of the hybrid layered preform coating mat disposed adjacent the substrate; applying unperforated braze preform over the depressed perforated hard particle preform with the opening aligned to the depressed section and the perforated braze preform inlay; and fusing the hybrid layered preform coating mat to the substrate with braze from the perforated braze preform and the unperforated braze preform, thereby forming channels between the hard elements located within the depressed section of the depressed perforated hard particle preform. Another feature of this aspect of the present inventions may be that the method may further include adding a nonperforated braze preform to the hybrid layered preform coating mat on top of the perforated braze preform inlay before fusing the layered preform coating mat to the substrate. Another feature of this aspect of the present inventions may be that the plurality of cavities in the depressed section of the depressed perforated hard particle preform are aligned with the plurality of cavities in the perforated braze preform inlay and the hard elements are positioned within the aligned cavities. Another feature of this aspect of the present inventions may be that before the hybrid layered preform coating mat is fused to the substrate, upper surfaces of the hard elements are generally flush with an upper surface of the perforated braze preform inlay and an upper surface of the depressed perforated hard particle preform. Another feature of this aspect of the present inventions may be that after the hybrid layered preform coating mat is fused to the substrate, upper surfaces of the fused hard elements outside of the depressed section are generally flush with an upper surface of a fused matrix composite formed from the fused depressed perforated hard particle preform and unperforated braze preform to form an unchanneled hard facing wear protection outside of the depressed section, and upper surfaces of the fused hard elements in the depressed section extend upwardly to define a plurality of channels between the hard elements. Another feature of this aspect of the present inventions may be that upper surfaces of the hard elements are generally projected above the upper surface of the perforated braze preform inlay before the hybrid layered preform coating mat is fused to the substrate. Another feature of this aspect of the present inventions may be that upper surfaces of the hard elements are generally recessed below the upper surface of the perforated braze preform inlay before the hybrid layered preform coating mat is fused to the substrate. Another feature of this aspect of the present inventions may be that the entire surface of the hybrid layered preform coating mat includes channels between the hard elements after the hybrid layered preformed coating mat is fused to the substrate. Another feature of this aspect of the present inventions may be that materials from the hybrid layered preform coating mat that are fused to the substrate consist of at least one of hard elements, hard particles, metallic particles, and ceramic particles. Another feature of this aspect of the present inventions may be that the hybrid layered preform coating mat is fused to the substrate with braze from the perforated braze preform inlay using one of (a) a vacuum furnace, (b) vacuum induction heating, and (c) laser heating. Another feature of this aspect of the present inventions may be that the method may further include post fusion heat treating the substrate and fused hybrid layered preform coating mat. Another feature of this aspect of the present inventions may be that the composite article is a radial bearing. Another feature of this aspect of the present inventions may be that the hard elements are one of tungsten carbide tiles and polycrystalline diamond solid. Another feature of this aspect of the present inventions may be that the depressed hard particle preform layer includes a plurality of hard elements disposed in a pattern with a hard particle preform located between and filling the space around the hard elements in some of the surface and partially filling the space around the hard elements in the rest of the surface to define a plurality of channels between the hard elements over a portion of the surface. Another feature of this aspect of the present inventions may be that the substrate is cylindrical. Another feature of this aspect of the present inventions may be that the base layer preform is formed of at least one of fine or ultrafine metallic particles, and fine or ultrafine ceramic or cermet particles, the particles being held together with a fibrillated polymer. Another feature of this aspect of the present inventions may be that creating the depressed hard particle preform includes applying alternating cuts to a preform material, and expanding the cut preform material to form cavities to receive the hard elements. Another feature of this aspect of the present inventions may be that creating the depressed perforated hard particle preform and the perforated braze preform inlay includes using the hard elements as punches to perforate the depressed perforated hard particle preform and the perforated braze preform inlay. Another feature of this aspect of the present inventions may be that the hybrid layered preform coating mat further includes a second preform layer disposed between the base layer preform and the depressed hard particle preform layer.

In yet another aspect, the present inventions may include a hybrid preform coating mat for attachment as part of a hardfacing wear protection to a substrate comprising: a base layer preform; a depressed perforated hard particle preform positioned on top of the base layer preform, and including a plurality of cavities and a depressed section; a perforated braze preform inlay including a plurality of cavities corresponding to the cavities in the depressed perforated hard particle preform and positioned within the depressed section of the depressed perforated hard particle preform; and, a plurality of hard elements, a portion of the hard elements positioned within the cavities in the depressed hard particle preform, and another portion of the hard elements positioned within the cavities in the perforated braze preform inlay and the corresponding cavities in the depressed section of the depressed hard particle preform. Another feature of this aspect of the present inventions may be that upper surfaces of the hard elements are generally flush with an upper surface of the perforated braze preform inlay. Another feature of this aspect of the present inventions may be that an upper surface of the perforated braze preform inlay is generally flush with an upper surface of the depressed perforated hard particle preform.

In still another aspect, the present inventions may include a composite article comprising: a substrate; and a fused matrix composite fused to the substrate, the fused matrix composite including a plurality of hard elements, a depressed section and a non-depressed section, the hard elements in the depressed section defining channels therebetween. Another feature of this aspect of the present inventions may be that upper surfaces of the hard elements in the fused matrix composite in the non-depressed section are generally flush with an upper surface of the fused matrix composite to define an unchanneled hard facing wear protection in the non-depressed section.

In another aspect, the present inventions may include a composite article comprising: a substrate; and a fused matrix composite fused to the substrate, the fused matrix composite including a plurality of hard elements, upper surfaces of which are disposed above an upper surface of the fused matrix composite to define a plurality of channels between the hard elements extending above the fused matrix composite.

Other features, aspects and advantages of the present inventions will become apparent from the following discussion and detailed description.

BRIEF DESCRIPTION OF THE DRAWINGS

FIG. 23A is a specific embodiment for a method of manufacturing a perforated multilayer preform, illustrating an unexpanded condition.

FIG. 23B shows the perforated multilayer preform from FIG. 23A in its expanded form.

FIG. 24 is a hard element with a raised edge along its perimeter on one face.

While the inventions will be described in connection with the specific embodiments disclosed, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

Figure 1:
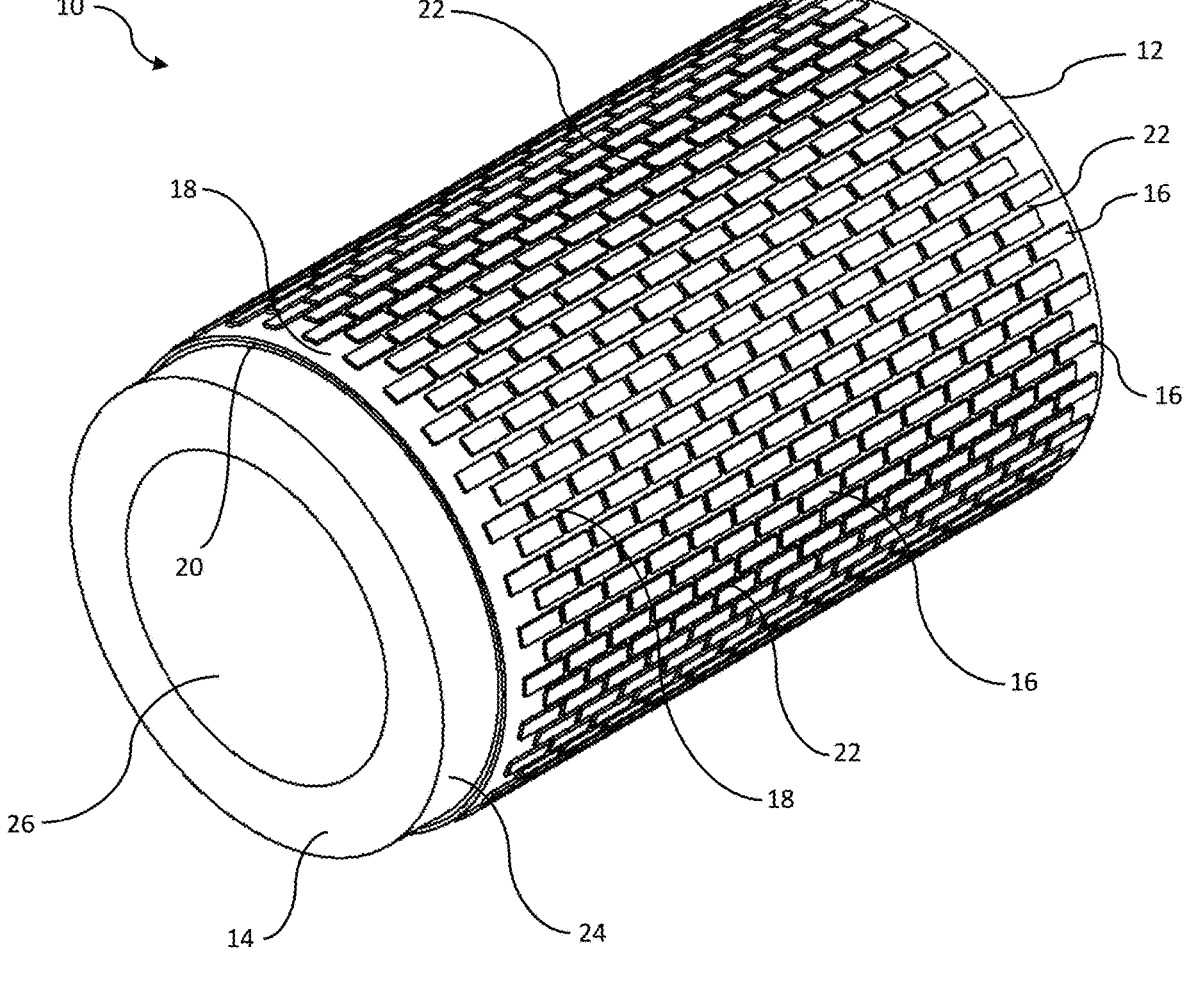
FIG. 1 is an illustrated isometric view of a radial bearing where the outer surface is the channeled hardfacing wear protection as an example of a finished part with the channeled hardfacing wear protection.

Referring to the drawings in detail, wherein like numerals denote identical elements throughout the several views, FIG. 1 shows an example of a finished part or composite article 10 with a channeled hardfacing wear protection coating 12. In this example the composite article 10 is a radial bearing. The radial bearing 10 consists of a tubular substrate 14 that has the channeled hardfacing wear protection coating 12 on it, the surface of which is the area of sliding contact for the radial bearing 10. The channeled hardfacing wear protection coating 12 is made up of an array of hard elements 16 that are fused to the tubular substrate 14 with fused matrix composite 18 and fused base layer 20. Between the hard elements 16, the fused matrix composite 18 is recessed below the surface of the hard elements 16 resulting in channels 22 over the sliding contact surface of the radial bearing 10. Those familiar in the art know the radial bearing 10 can have the channeled hardfacing wear protection coating 12 on an outer surface 24 of the tubular substrate 14, or the channeled hardfacing wear protection coating 12 can be on an inner surface 26 of the tubular substrate 14. The channeled hardfacing wear protection coating 12 can also be applied to a variety of substrates, such as flat or undulating surfaces depending on the application and can be used in applications not limited to radial bearings.

Figure 2:
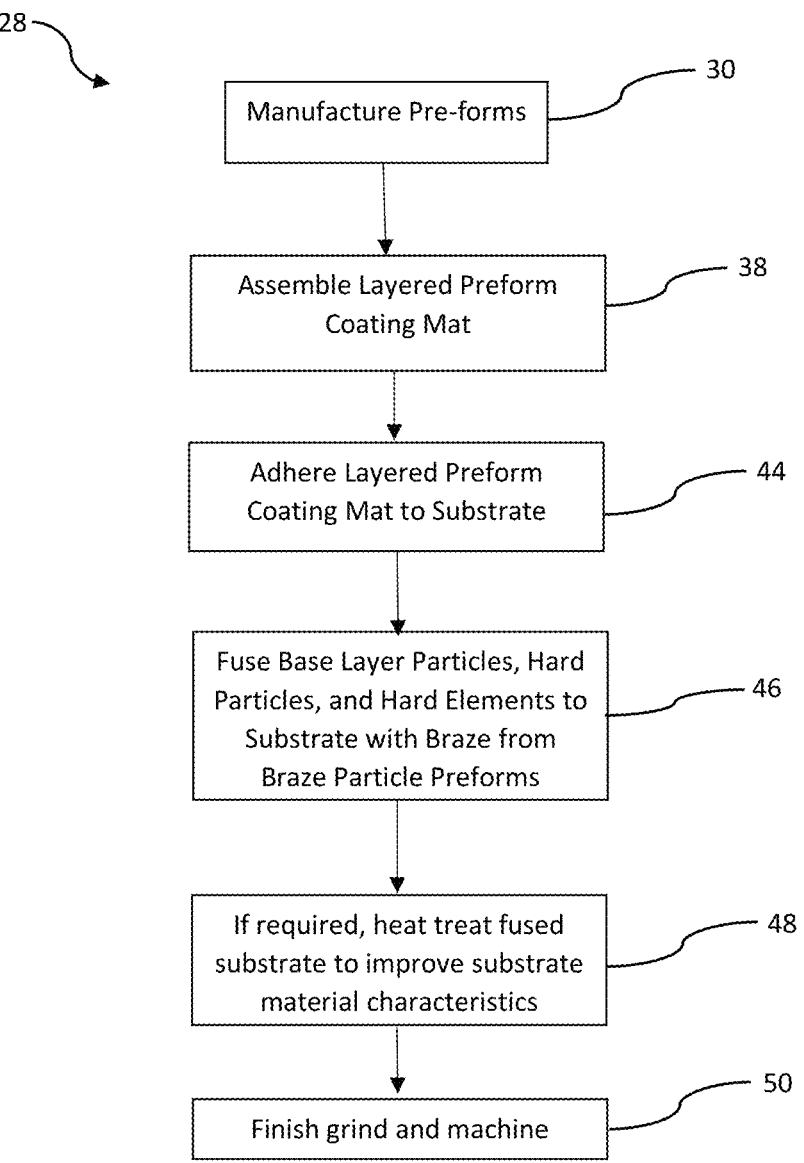
FIG. 2 is a flow chart explaining the manufacturing process for the channeled hardfacing wear protection.

FIG. 2 describes a specific embodiment of a channeled hardfacing wear protection manufacturing process 28. It describes the process for applying a channeled hardfacing wear protection coating 12 that has channels 22 over the entire coating surface to a substrate 14. To begin the process, at step 30, pre-forms for the various layers needed to form a specific embodiment of the coating 12 are prepared. At minimum, as further discussed below such as in connection with FIGS. 3 and 4, there are preferably at least three pre-forms prepared at step 30, namely: (1) a base layer preform 32; (2) a perforated hard particle preform 34 and (3) a perforated braze particle preform 36. Next, with reference to FIG. 2, at step 38, materials that are to be used for the layered preform coating mat 40 (e.g., the base layer preform 32, the perforated hard particle preform 34, the perforated braze particle preform 36, and hard elements 42) are assembled into a layered preform coating mat 40 on a flat surface (see FIG. 3). Next, at step 44, the layered preform coating mat 40 is applied to the surface of a tubular substrate that it is to be fused to (e.g., outer surface 24 of tubular substrate 14 shown in FIG. 1). Next, at step 46, the layered preform coating mat 40 is fused to the substrate 14 using any one of a number of high temperature processes (including but not limited to vacuum radiant heating, vacuum induction heating, or laser heating). Specifically, the braze from the perforated braze particle preform 36 fuses the hard elements 42, the hard particles of the perforated hard particle preform 34 and the ceramic or metallic particles of the base layer preform 32 to the tubular substrate 14. Afterward, at step 48, if required, the entire assembly is heat treated to give the substrate the material properties required for the finished part. Finally, at step 50, the fused substrate is then finished with any required grinding and/or finish machining operations to have the part fit the end user's dimensional specifications. Additional alternatives concerning steps 38 and 44 are discussed below.

Figures 3, 4:
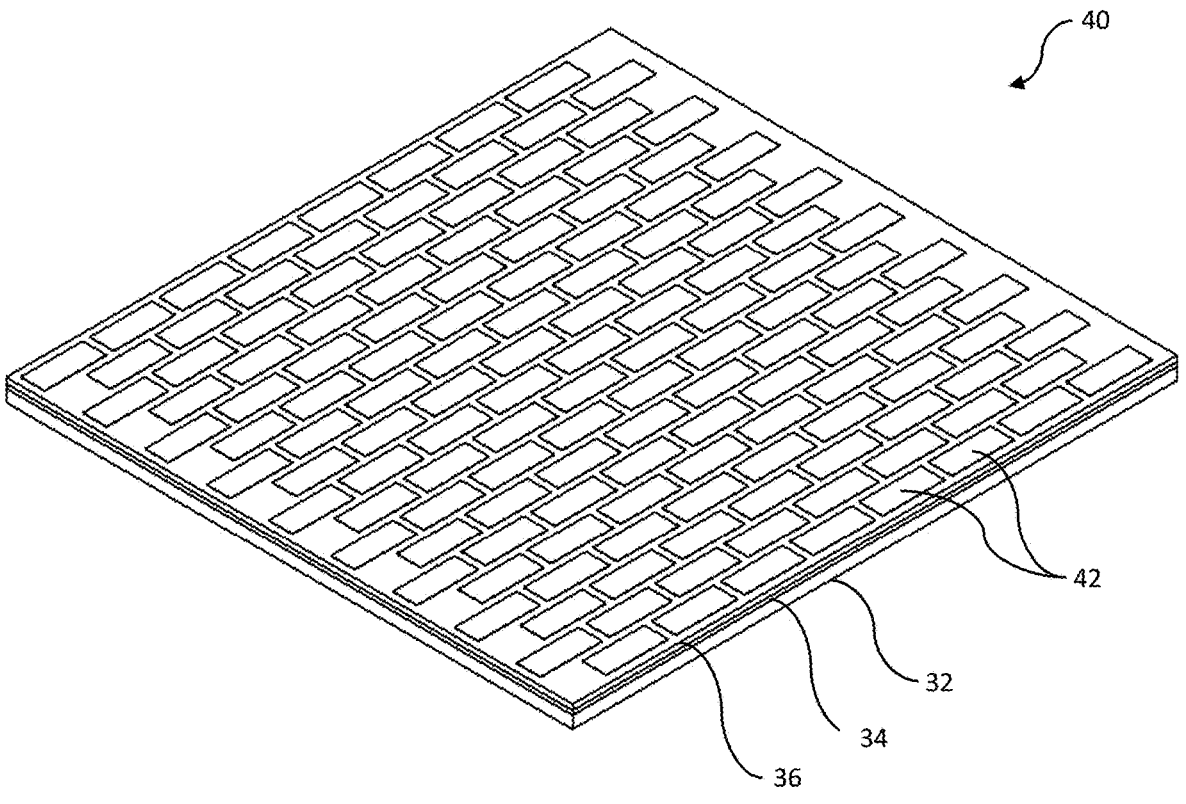
FIG. 3 is an illustrated isometric view of the layered preform coating mat.
FIG. 4 is an illustrated detail view of the cross-section of the layered preform coating mat shown in FIG. 3.

FIG. 3 is an illustrated isometric of a specific embodiment of the layered preform coating mat 40 that is assembled in step 38 of the channeled hardfacing wear protection manufacturing process 28. The layered preform coating mat 40 is made up of several components. There is a base layer preform 32 upon which the next layer is attached. In a specific embodiment the base layer preform 32 is an article made up of fine and/or ultrafine metallic or ceramic particles held together with a fibrillated polymer. Over the base layer preform 32 is a second layer containing hard elements 42, the perforated hard particle preform 34, and the perforated braze particle preform 36. In this embodiment the hard elements 42 are arrayed in a pattern such that the spacing between them is even and they cover the area that will become the wear protected area, but they can be patterned in any spacing and orientation that is appropriate for the application. The hard elements 42 can be made from tungsten carbide, polycrystalline diamond solid, or a similar hard composite and can be in any one of a number of shapes (e.g., round, square, rectangular, hexagon, etc.) and may have flat, rounded, curved, ridged, or rippled bottoms. Between the hard elements 42 are two layers formed by the perforated hard particle preform 34 and the perforated braze particle preform 36. The two layers are organized such that the perforated hard particle preform 34 is located adjacent to the base layer preform 32, and the perforated braze particle preform 36 is adjacent to opposite side of the perforated hard particle preform 34. In a specific embodiment, the perforated hard particle preform 34 may be an article made up of fine and/or ultrafine hard particles held together with a fibrillated polymer. The hard particles can be, but not limited to, spherical or crushed tungsten carbide, thermally stable polycrystalline diamond, cubic boron nitride, or a similar hard material. In a specific embodiment, the perforated braze particle preform 36 may consist of fine and/or ultrafine braze particles held together with a fibrillated polymer. An adhesive may be used to secure the hard elements 42, the perforated hard particle preform 34, the perforated braze particle preform 36, and the base layer preform 32 together. In a specific embodiment, the perforated hard particle preform 34 and perforated braze particle preform 36 with hard elements 42 may be positioned on the flat surface first with the perforated braze particle preform 36 against the flat surface, and then the base layer preform 32 may be adhered to the top of the perforated hard particle preform 34 and hard elements 42 using but not limited to adhesive.

FIG. 4 is an illustration of a detail of a section view of the layered preform coating mat 40. The hard elements 42 are located on the base layer perform 32 in the desired pattern. The perforated hard particle preform 34 is located in between the hard elements 42 and is adjacent to the base layer preform 32. The perforated braze particle preform 36 is located in between the hard elements 42 and is adjacent to and positioned on top of the perforated hard particle preform 34. In this embodiment the perforated braze particle preform 36 is flush to the tops of the hard elements 42. In a specific embodiment, the size, spacing and pattern of the perforated hard particle preform 34 and the perforated braze particle preform 36 may be the same.

Figure 5:
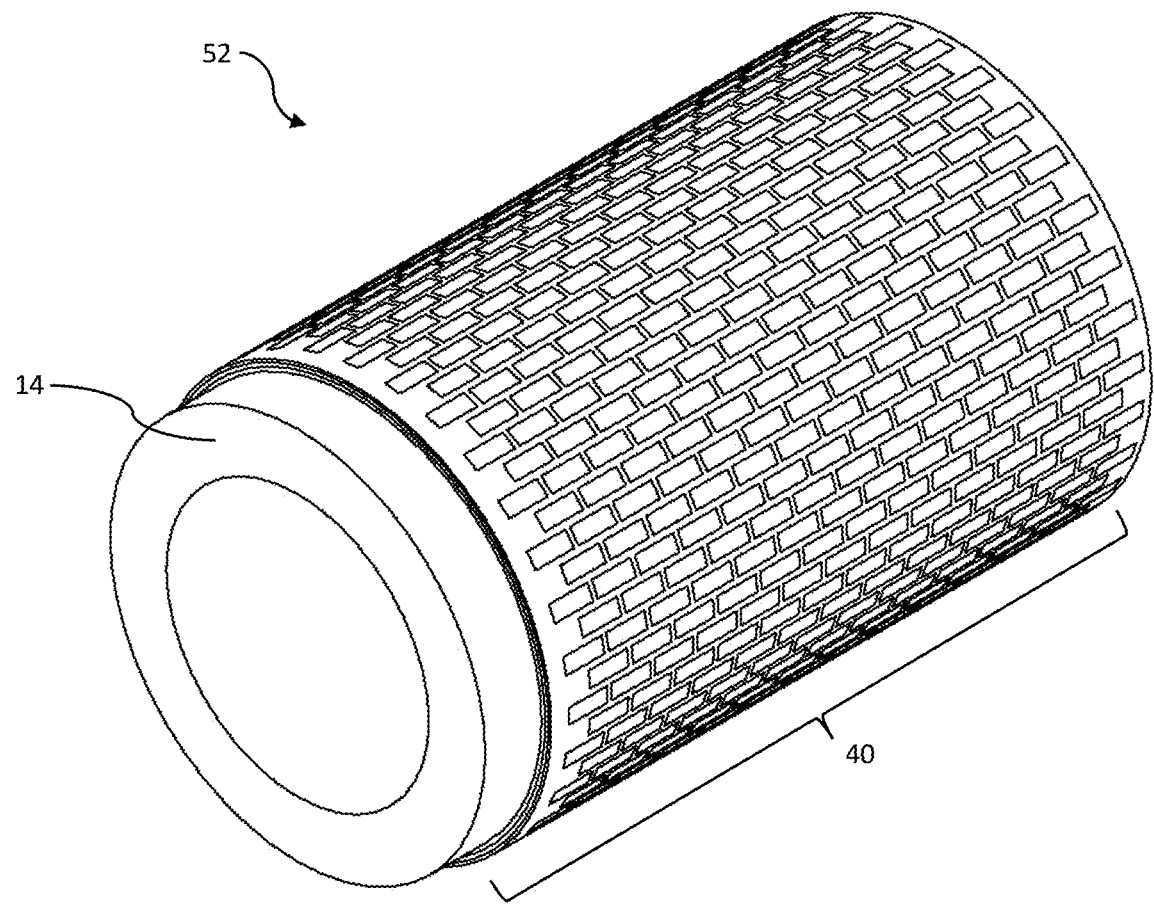
FIG. 5 is an illustrated isometric view of a pre-fusion blank.

Another aspect of the present inventions is to assemble a pre-fusion blank 52 by placing the layered preform coating mat 40 on a substrate. FIG. 5 shows a pre-fusion blank 52 with the layered preform coating mat 40 applied to the tubular substrate 14. The layered preform coating mat 40 can be adhered to the tubular substrate 14 with, but not limited to, adhesives or induction heating. In the case of a tubular substrate 14, the layered preform coating mat 40 may also meet up at its ends when wrapped on the tubular substrate 14.

Figure 6:
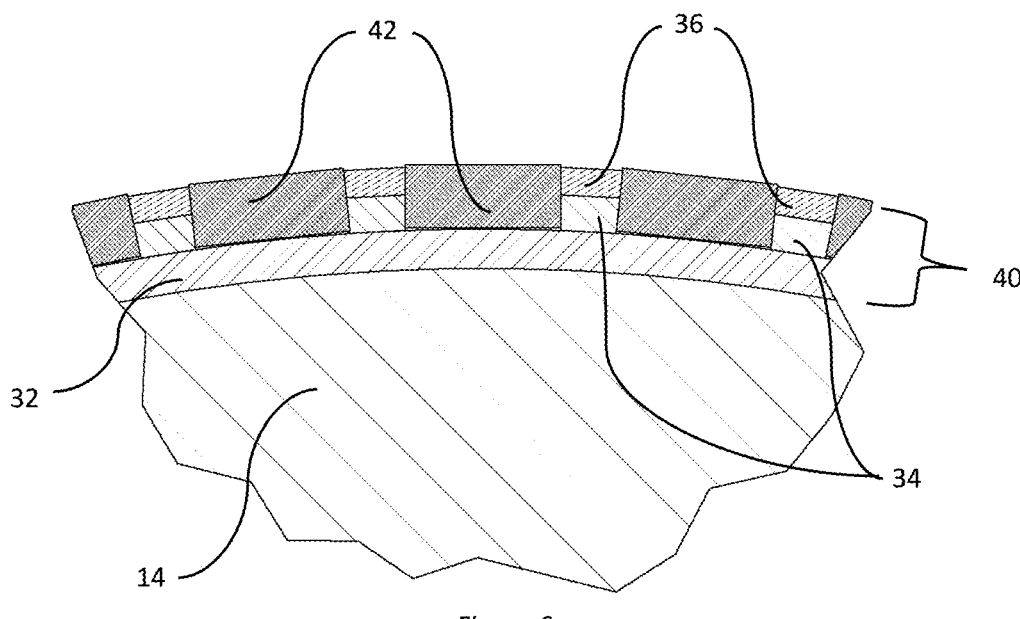
FIG. 6 is an illustrated detail view of the cross-section of the pre-fusion blank from FIG. 5 showing the layered preform coating mat applied to a tubular substrate.

FIG. 6 shows a cross-sectional view of the pre-fusion blank 52 with the layered preform coating mat 40 on the tubular substrate 14 prior to fusion. It shows that the base layer preform 32 is in contact with the tubular substrate 14. The layer with the hard elements 42 has the perforated hard particle preform 34 adjacent to and between the base layer perform 32 and the perforated braze particle preform 36, and the perforated braze particle preform 36 is adjacent to and above the perforated hard particle preform 34.

The pre-fusion blank 52 is then processed with any one of a number of methods that result in the fine and/or ultrafine metallic or ceramic particles from the base layer preform 32 and the fine and/or ultrafine hard particles from the perforated hard particle preform 34 of the layered preform coating mat 40 being fused to the tubular substrate 14 in step 46 of FIG. 2. In a specific embodiment, a vacuum furnace is used. In this embodiment, the pre-fusion blank 52 is heated up in a vacuum through a staged heating cycle that results in adhesives, polymers and any additional contaminants being burned off. Once the fusion temperature is approached, the braze particles in the perforated braze particle preform 36 melt and braze is drawn into voids in the metallic/ceramic particles and hard particles in the base layer preform 32 and the perforated hard particle preform 34, and around the hard elements 42, fusing them in place to the tubular substrate 14. The part is then cooled, creating a fused substrate 54 with a fused matrix composite 58, as discussed below in connection with FIGS. 7 and 8.

Figure 7:
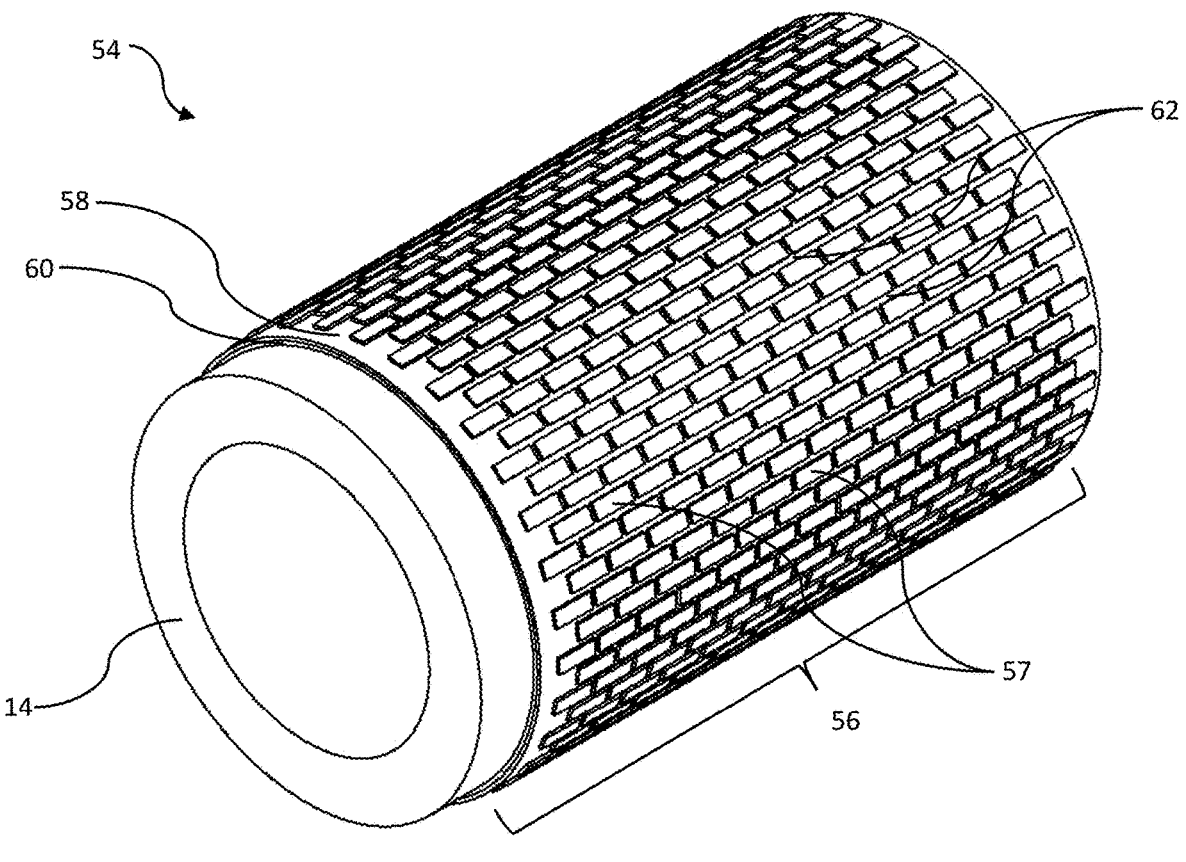
FIG. 7 is an illustrated isometric view of the fused blank.

FIG. 7 is an illustrated isometric of one embodiment of a fused substrate 54. The channeled hard facing wear protection 56 is on the outside surface for nearly the full length of the tubular substrate 14. The surface of the channeled hard facing wear protection 56 consists of fused hard elements 57 that are fused in place with the fused matrix composite 58 and the fused base layer 60. The surface of the channeled hard facing wear protection coating 56 also has channels 62 around the fused hard elements 57, and they are bottomed with fused matrix composite 58.

Figure 8:
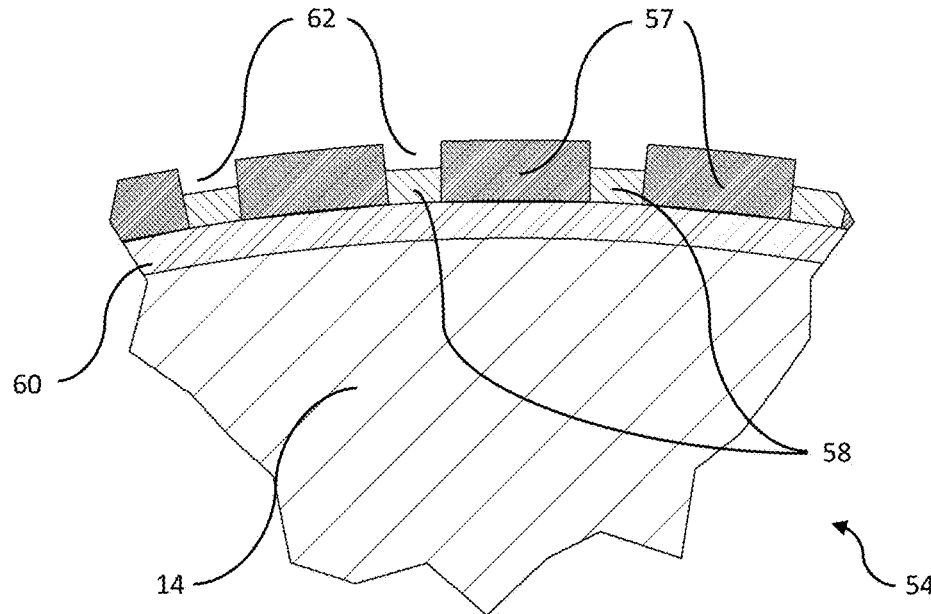
FIG. 8 is an illustrated detail view of the cross-section of the fused blank from FIG. 7 showing the channeled hardfacing wear protection on the tubular substrate.

FIG. 8 shows a cross-section of the fused substrate 54 in a specific embodiment in the same plane that the cross-section in FIG. 6 is shown. The base layer preform 32 has had the polymer burnt off and been infiltrated with the braze from the perforated braze particle preform 36 to form a fused base layer 60 that has fused with the hard elements 57, the fused matrix composite 58, and with the surface of the tubular substrate 14. The fine and/or ultrafine metallic or ceramic particles from the base layer preform 32 may or may not have partially or fully alloyed with the braze depending on the alloy or ceramic used for the base layer preform 32. The perforated hard particle preform 34 has had the polymer burnt off and has also been infiltrated with braze from the perforated braze particle preform 36 to form the fused matrix composite 58 that has fused to the fused base layer 60 and to the sides of the hard elements 57. The fused hard elements 57 and the fine and/or ultrafine hard particles from the perforated hard particle preform 34 preferentially remain intact. The perforated braze particle preform 36 that existed on the pre-fusion blank 52 is now gone after having the polymer burnt off and the braze particles melted and infiltrated into the layers below. The end result is a channeled hardfacing wear protection coating 56 consisting of fused hard elements 57, fused matrix composite 58, and fused base layer 60, all of which is metallurgically fused to the tubular substrate 14 and to each other. There are channels 62 that have formed adjacent to the surface of the fused blank 54 between the fused hard elements 57 and are bottomed by fused matrix composite 58 that contains fine and/or ultrafine hard particles for excellent erosion protection properties.

The next step to be performed is heat treatment of the fused substrate 54 to strengthen the material of the tubular substrate, if it is required. Heat treatment processes including but not limited to, induction heat treating, or oil bath quench and temper techniques are performed on the fused radial bearing blank to give the substrate the material properties required.

The final steps to completing the hardfaced wear protected component is to apply conventional finishing techniques (grinding, turning, milling, EDM, etc) to complete the manufacturing of the part as required, as shown at step 50 in FIG. 2.

Those skilled in the art of hardfaced wear protection coatings will recognize that the above process can be applied to radial bearings with their wear area on their outer surface (OD), or radial bearings with their wear area on the inner surface (ID). It can also be applied to flat, curved, or other continuous surfaces where wear protection is required.

FIG. 6 illustrates a preferred embodiment whereby the top of the perforated braze particle preform 36 is flush to the tops of the hard elements 42.

Figure 9:
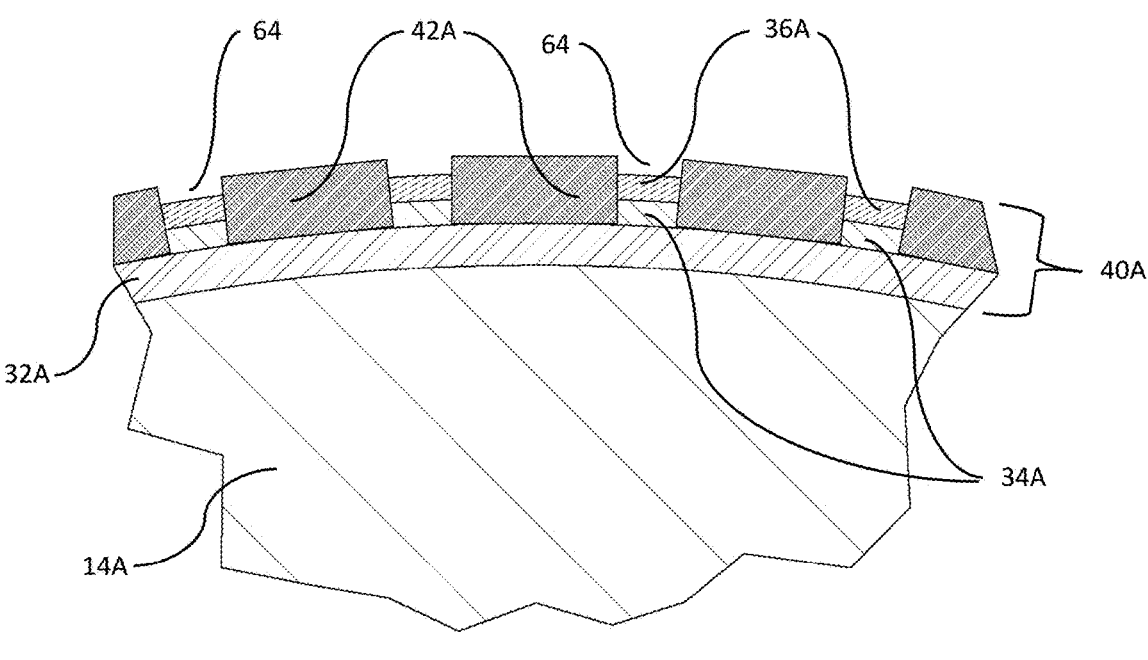
FIG. 9 is an illustrated section view of another embodiment of the layered preform coating mat on a tubular substrate where the perforated braze particle preform is recessed below the top of the hard elements.

FIG. 9 illustrates the cross section of another embodiment of the pre-fusion blank 52 that uses a modified layered preform coating mat 40A applied to a tubular substrate 14A. The layered preform coating mat 40A consists of the base layer preform 32A, hard elements 42A, perforated hard particle preform 34A, and perforated braze particle preform 36A. In this specific embodiment, the cumulative thickness of the perforated hard particle preform 34A and the perforated braze particle preform 36A layers is less than the thickness of the hard elements 42A. This results in recesses 64 where the top of the perforated braze particle preform 36A is recessed back from or below the tops of the hard elements 42A. This embodiment may be used without any adverse effects to the fusion process or the integrity of the hardfacing wear protection coating.

Figure 10:
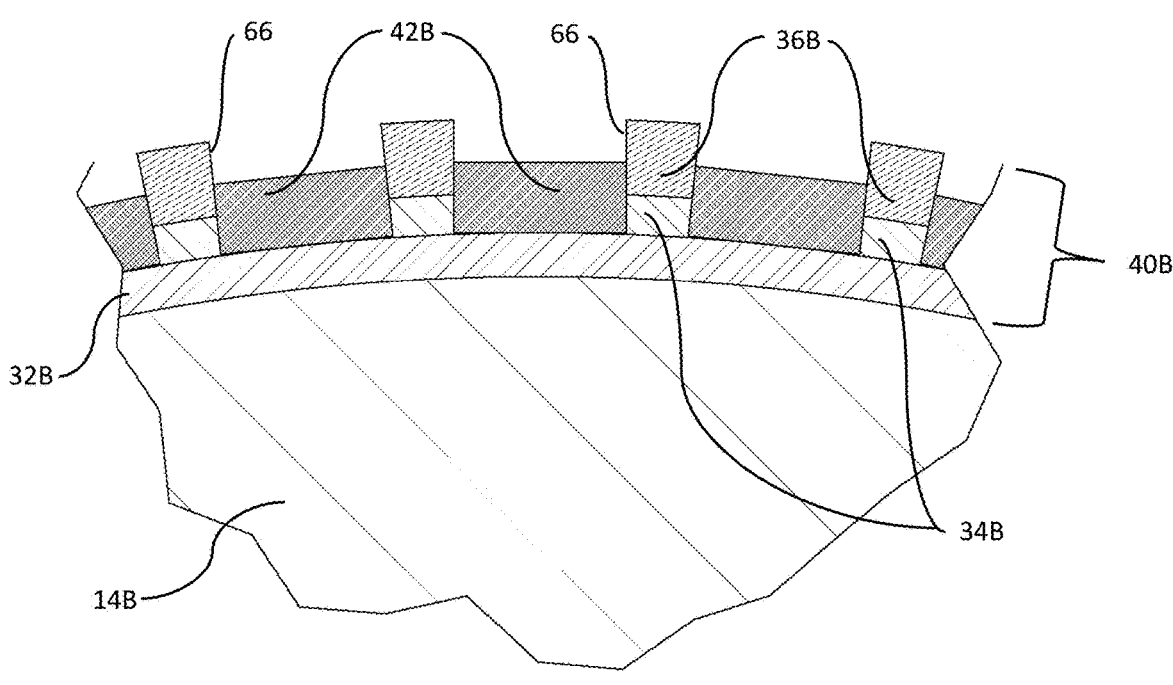
FIG. 10 is an illustrated section view of another embodiment of the layered preform coating mat on a tubular substrate where the perforated braze particle preform is projected above the top of the hard elements.

FIG. 10 illustrates the cross section of another embodiment of the pre-fusion blank 52 that uses a modified layered preform coating mat 40B applied to a tubular substrate 14B The layered preform coating mat 40B consists of the base layer preform 32B, hard elements 42B, perforated hard particle preform 34B, and perforated braze particle preform 36B. The cumulative thickness of the perforated hard particle preform 34B and the perforated braze particle preform 36B layers is greater than the thickness of the hard elements 42B. This results in projections 66 where the top of the perforated braze particle preform 36B is projected above the tops of the hard elements 42B. This embodiment may be used without any adverse effects to the fusion process or the integrity of the hardfacing wear protection coating.

Figure 11:
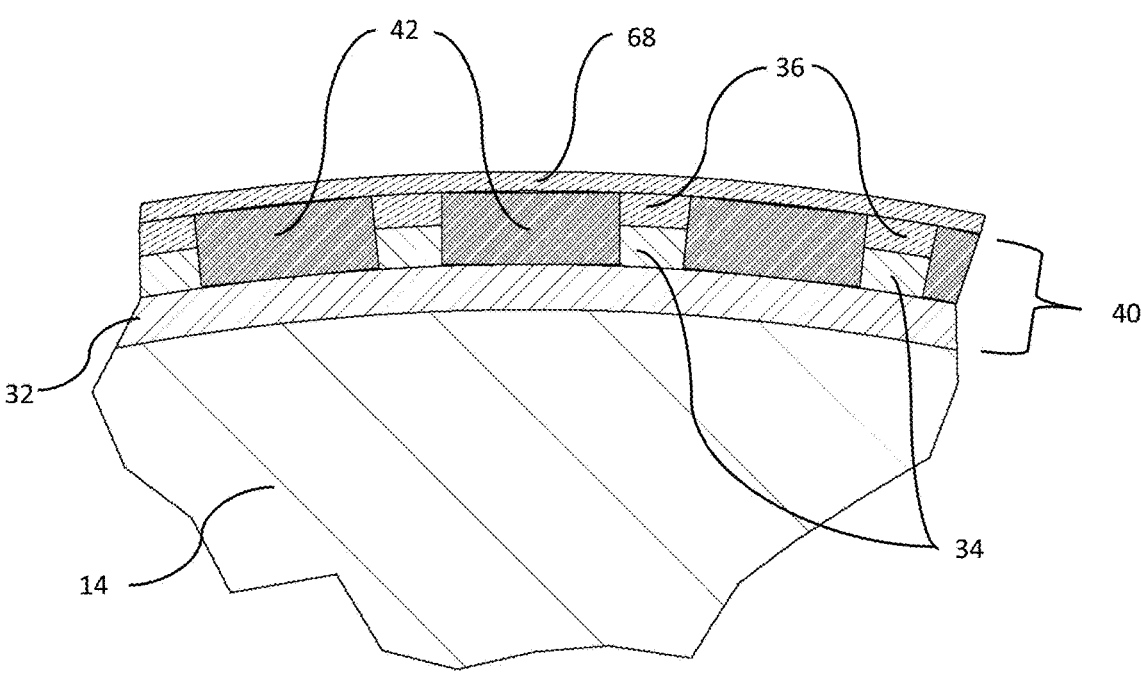
FIG. 11 in an illustrated section view of another embodiment of the layered preform coating mat on a tubular substrate where the perforated braze particle preform is flush to the top of the hard elements and supplemental braze particle preform is applied.

FIG. 11 illustrates the cross section of another embodiment of the pre-fusion blank 52 that uses a supplemental braze particle preform 68 with the layered preform coating mat 40 applied to a tubular substrate 14 The layered preform coating mat 40 consists of the base layer preform 32, hard elements 42, perforated hard particle preform 34, and perforated braze particle preform 36. The cumulative thickness of the perforated hard particle preform 34 and the perforated braze particle preform 36 layers is the same as the thickness of the hard elements 42. A supplemental braze particle preform 68 is applied over top of the layered preform coating mat 40. This embodiment may be used without any adverse effects to the fusion process or the integrity of the hardfacing wear protection coating.

In the description provided above for the channeled hard facing wear protection coating manufacturing process 28, manufacturing a hardfacing wear protection that has channels over the entire surface is explained. However, the process can be modified so a highly customized channeled hardfacing wear protection can be manufactured where select areas of the surface can have channels located between the fused hard elements, and remaining areas of the surface can have matrix composite flush to the top of the fused hard elements. In certain applications this selectivity can be advantageous to the performance of a hardfacing wear protection coating by providing preferred areas for fluid circulation resulting in improved cooling, lubrication, and load distribution.

Figure 12:
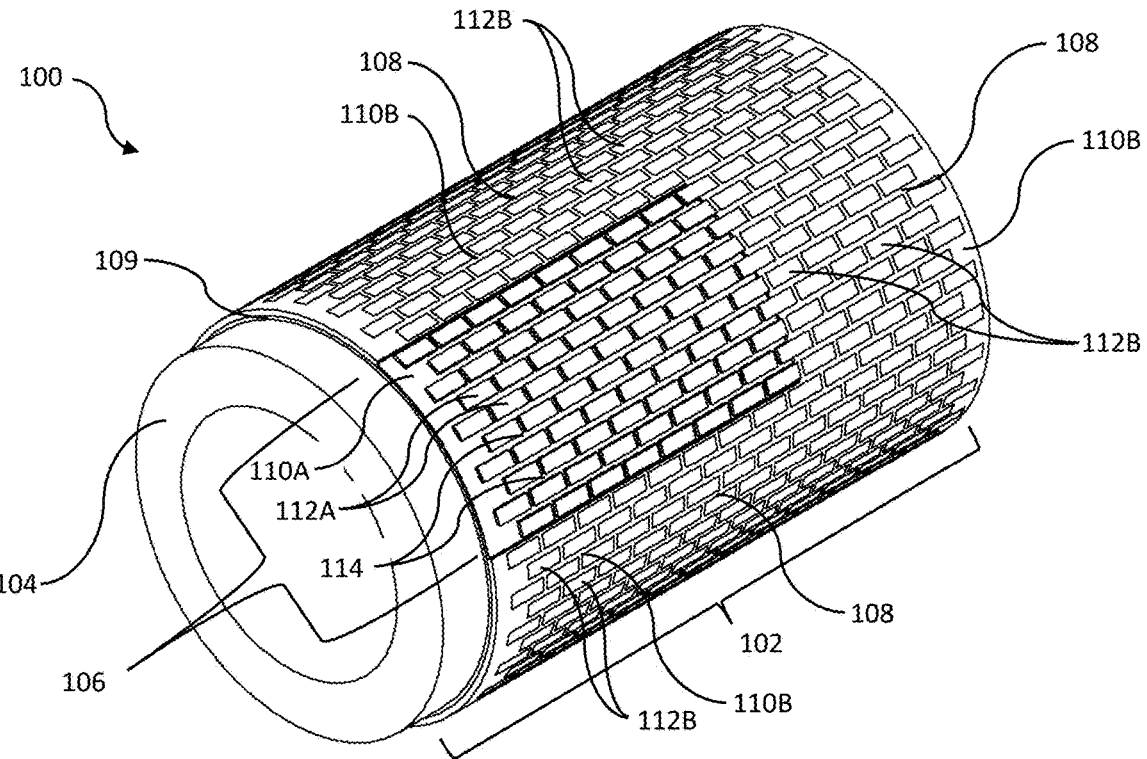
FIG. 12 is an illustrated isometric view of embodiment of a partially channeled radial bearing.

FIG. 12 is an illustrated isometric view of an embodiment of a partially channeled radial bearing 100. In this embodiment the partially channeled radial bearing 100 has a partially channeled hardfacing wear protection 102 that has been applied to the outside of a tubular substrate 104. The partially channeled hardfacing wear protection 102 has a portion that is channeled hardfacing wear protection 106 and the remaining portion is unchanneled hardfacing wear protection 108. In this embodiment the profile of the channeled hardfacing wear protection 106 extends only for a portion of the full length and a portion of the circumference of the partially channeled hardfacing wear protection 102. However, the profile of the channeled hardfacing wear protection 106 can be of any shape, length, size, location, and number as desired and does not have to extend into the ends of the partially channeled hardfacing wear protection 102. In the channeled hardfacing wear protection 106, the matrix composite 110A is recessed back from the tops of the fused hard elements 112A creating the channels 114 and leaving the fused hard elements 112A as the sliding contact surfaces in the channeled hardfacing wear protection 106 of the partially channeled radial bearing 100. The remaining surface is unchanneled hardfacing wear protection 108 where the matrix composite 110B is flush with the fused hard elements 112B and both the fused hard elements 112B and the matrix composite 110B will be the sliding contact surfaces in the unchanneled hardfacing wear protection 108 of the partially channeled radial bearing 100.

Figure 13:
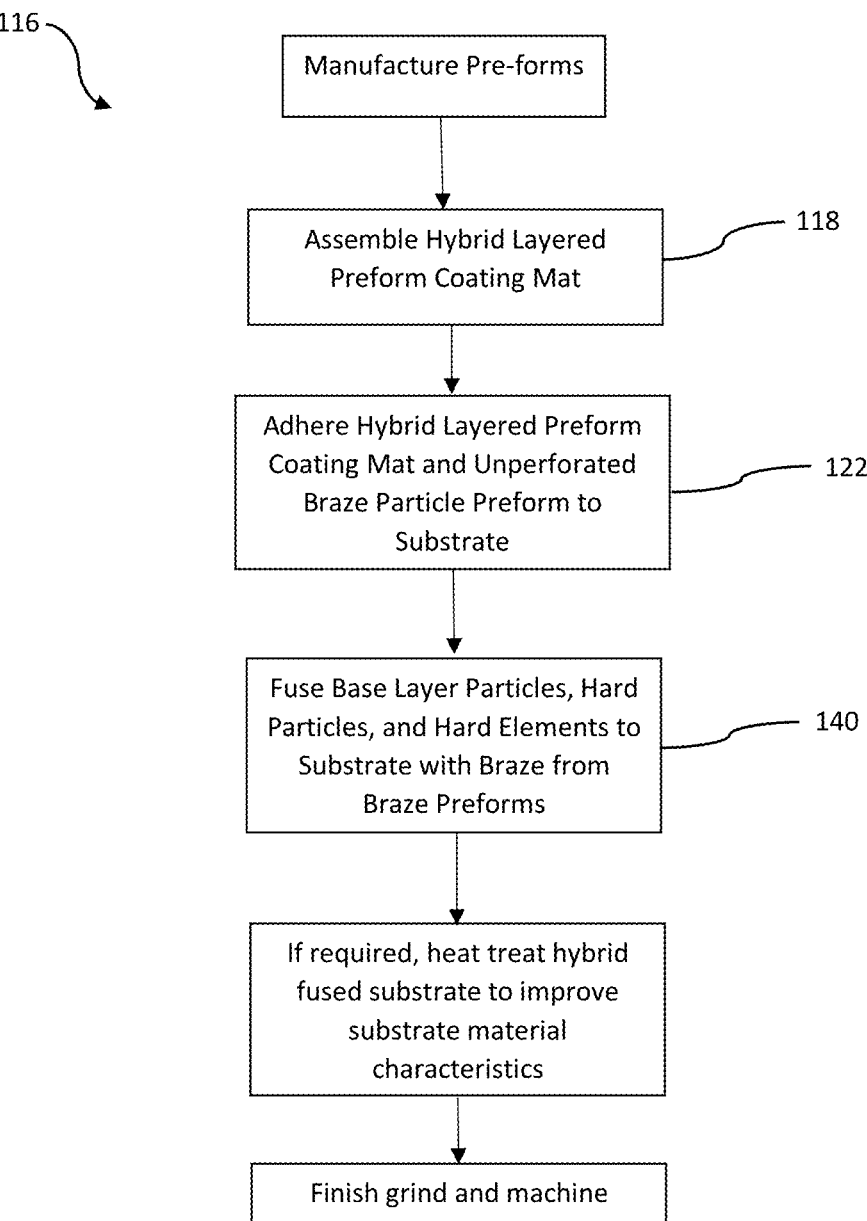
FIG. 13 is a flow chart explaining the manufacturing process for the partially channeled hardfacing wear protection.

FIG. 13 describes a specific embodiment of a partially channeled hardfacing wear protection manufacturing process 116. It describes the process for applying a partially channeled hardfacing wear protection coating 102 that has channels 114 in a portion of the entire coating surface to a substrate 104. The partially channeled hardfacing wear protection manufacturing process 116 is a variation of the channeled hardfacing wear protection manufacturing process 28 with two primary differences. First, in step 118, a hybrid layered preform coating mat 120 is assembled instead of a layered preform coating mat 40. Second, in step 122, a hybrid layered preform coating mat 120 (see FIG. 14) and an unperforated braze particle preform 124 (see FIGS. 17 and 18) are adhered to the substrate instead of just the layered preform coating mat 40. The unique features of these steps and their results are described below in greater detail.

Figure 14:
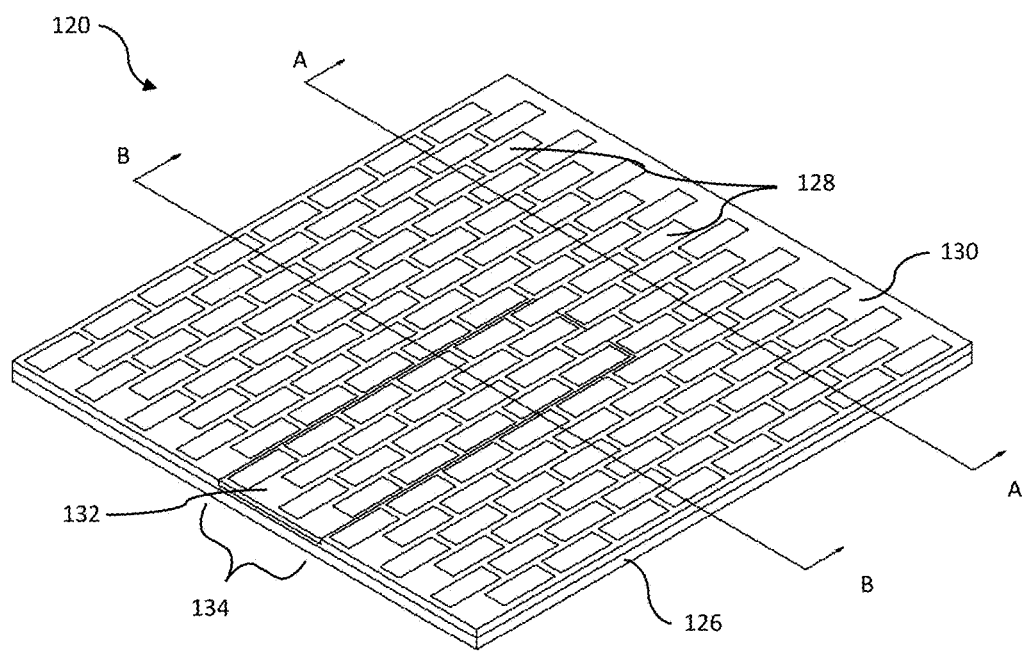
FIG. 14 is an illustrated isometric view of an embodiment of a hybrid layered preform coating mat.

FIG. 14 is an illustrated isometric of an embodiment of a hybrid layered preform coating mat 120. Many of the features of the hybrid layered preform coating mat 120 are the same as the layered preform coating mat 40 from FIG. 3, but there are some distinct differences that allow for the controlled placement of channels 114 in the partially channeled hardfacing wear protection coating 102. In this specific embodiment, the hybrid layered preform coating mat 120 is made up of several components. There is a base layer preform 126 upon which the next layer is attached. In a specific embodiment the base layer preform 126 is an article made up of fine and/or ultrafine metallic or ceramic particles held together with a fibrillated polymer.

Over the base layer preform 126 is a second layer containing hard elements 128, a depressed perforated hard particle preform 130, and a perforated braze particle preform inlay 132. The hard elements 128 can be made from tungsten carbide, polycrystalline diamond solid, or a similar hard composite and can be in any one of a number of shapes (e.g., round, square, rectangular, hexagon, etc.) and may have flat, rounded, curved, ridged, or rippled bottoms. They are typically, but not limited to, applied in a pattern such that the spacing between them is even and cover the area that will become the wear protected area.

Figure 15:
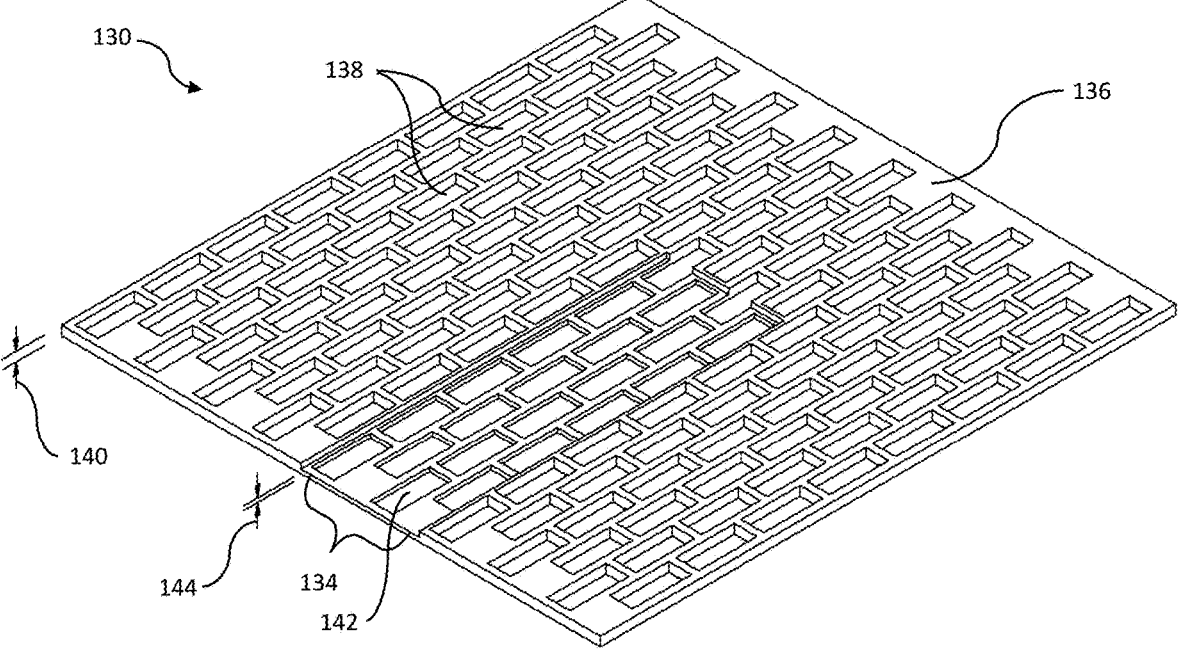
FIG. 15 is an illustrated isometric view of an embodiment of a depressed perforated hard particle preform.

Between the hard elements 128 and adjacent to the base layer preform 126 is the depressed perforated hard particle preform 130 that contains one or more depressions 134. FIG. 15 is an illustrated isometric of a specific embodiment of the depressed perforated hard particle preform 130 from FIG. 14, but without the perforated braze particle preform inlay 132. The depressed perforated hard particle preform 130 consists of a hard particle preform 136 that contains one or more depressions 134. The dimensions and locations of the depressions 134 in the depressed perforated hard particle preform 130 correlate with the dimensions and locations where channels 114 between the fused hard elements 112A (see FIG. 12) are desired in the channeled hardfacing wear protection 106 on a partially channeled hardfacing wear protection coating 102. The areas outside the depressions 134 correlate with the unchanneled hard facing wear protection 108 of FIG. 12. The areas outside the depression 134 contain perforations 138 that, in a specific embodiment, may have the same pattern as the hard elements 128 in the hybrid layered preform coating mat 120 from FIG. 14. In this area, the thickness 140 of the hard particle preform 136 may be approximately the same as the thickness of the hard elements 28. The depressions 134 contain perforations 142 that also have the same pattern as the hard elements 128 in the hybrid layered preform coating mat 120 from FIG. 14. In this area, the thickness 144 of the hard particle preform 136 may be approximately the same as the thickness of the resulting fused matrix composite 110A in the bottom of the channels 114 from FIG. 12. In a specific embodiment, the depressed perforated hard particle preform 130 may be an article made up of fine and/or ultrafine hard particles held together with a fibrillated polymer. The hard particles can be, but not limited to, spherical or crushed tungsten carbide, thermally stable polycrystalline diamond, cubic boron nitride, or a similar hard material. An adhesive may be used to secure the hard elements 128 and the depressed hard particle preform 130 to the base layer preform 126.

Figure 16:
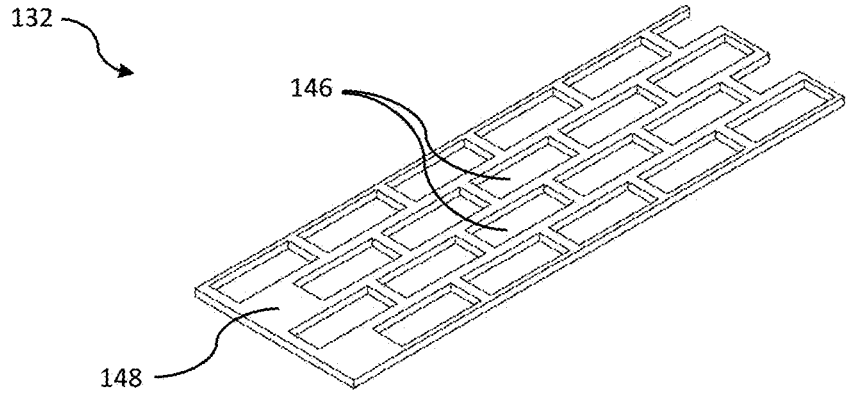
FIG. 16 is an illustrated isometric view of an embodiment of a perforated braze particle preform inlay.

Referring to FIG. 14, in the depressions 134 of the depressed perforated hard particle preform 130, and between the hard elements 128 is located the perforated braze particle preform inlay 132. FIG. 16 is an illustrated isometric of a specific embodiment of the perforated braze particle preform inlay 132. The perforated braze particle preform inlay 132 consists of a braze particle preform 148 that contains perforations 146 that, in a specific embodiment, may have the same pattern as the perforations 142 in the depressions 134 of the depressed perforated hard particle preform 130. The dimensions and locations of the perforated braze particle preform inlay 132 in the depressed perforated hard particle preform 130 may, in a specific embodiment, correlate with the dimensions and locations where channels 114 between the fused hard elements 112A are desired in the channeled hardfacing wear protection 106 on a partially channeled hardfacing wear protection 102 (see FIG. 12). The thickness of the perforated braze particle preform inlay 132 may or may not be the same thickness as the depth of the channels 114 in the channeled hardfacing wear protection 106. In a specific embodiment, the perforated braze particle preform inlay 132 may consist of fine and/or ultrafine braze particles held together with a fibrillated polymer.

Figure 17:
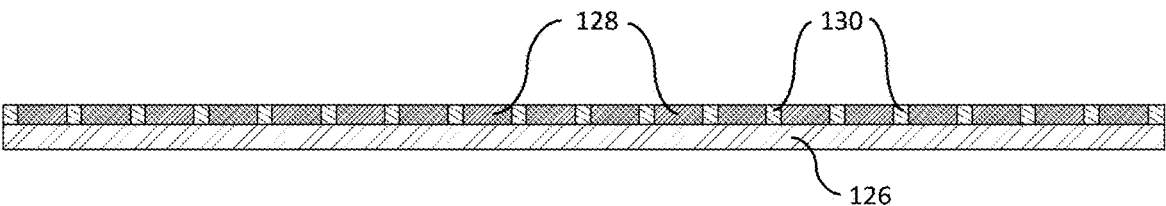
FIG. 17 is an illustrated section view taken along line A-A of FIG. 14 showing the hybrid layered preform coating mat in FIG. 14 through the section not incorporating a perforated braze particle preform inlay.

FIG. 17 is a sectional view along line A-A of FIG. 14 of the hybrid layered preform coating mat 120 in FIG. 14 that illustrates a cross-section of the hybrid layered preform coating mat 120 that does not contain a depression 134 in the depressed perforated hard particle preform 130. In this cross section, the hard elements 128 are arrayed in the perforations of the depressed perforated hard particle preform 130 and are located on the base layer preform 126. The thickness of the depressed perforated hard particle preform 130 in this cross section is approximately the same as the thickness of the hard elements 128.

Figure 18:
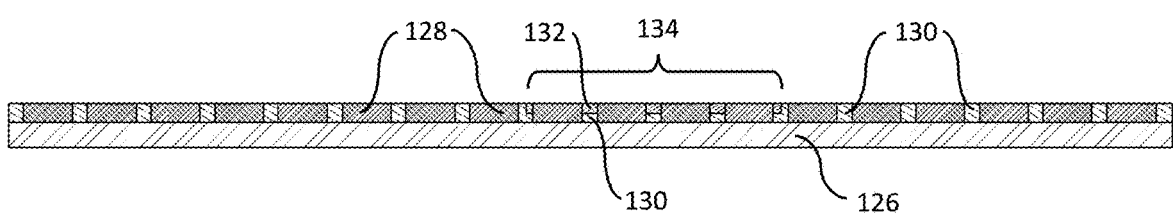
FIG. 18 is an illustrated section view taken along line B-B of FIG. 14 showing the hybrid layered preform coating mat in FIG. 14 through the section incorporating a perforated braze particle preform inlay.

FIG. 18 is a sectional view along line B-B of FIG. 14 of the hybrid layered preform coating mat 120 in FIG. 14 that illustrates a cross-section of the hybrid layered preform coating mat 120 that does contain a depression 134 in the depressed perforated hard particle preform 130. Like the section in FIG. 17, the hard elements 128 are arrayed in perforations of the depressed perforated hard particle preform 130 and are located on the base layer preform 126. In the areas outside the depression 134, the thickness of the depressed perforated hard particle preform 130 is approximately the same as the thickness of the hard elements 128. In the depression 134, however, the thickness of the depressed perforated hard particle preform 130 is the same as the thickness of the fused matrix material 110A (see FIG.

12) required in the bottom of the channels 114 in the channeled hardfacing wear protection 106 on a partially channeled hardfacing wear protection coating 102. Within the depression 134, and around the hard elements 128 in the depression 134 is the perforated braze particle preform inlay 132. In this embodiment, the perforated braze particle preform inlay 132 is the same thickness as the depth of the depression 134 so the perforated braze particle preform inlay 132 is flush with the tops of the hard elements 128.

Figure 19:
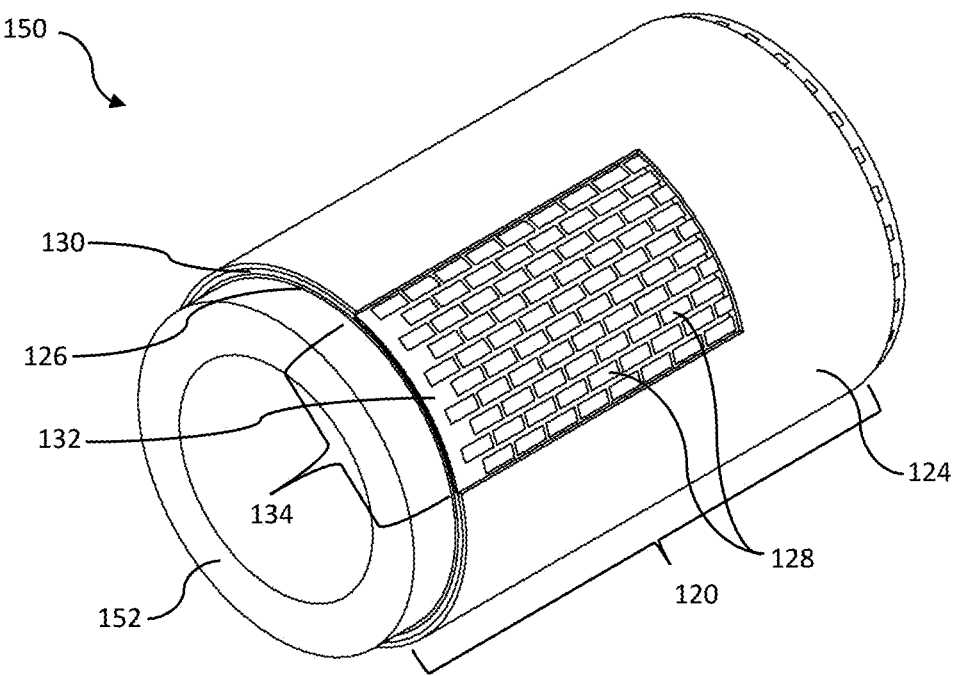
FIG. 19 is an illustrated isometric view of the hybrid pre-fusion blank.

Once the hybrid layered preform coating mat 120 has been assembled per step 118 of FIG. 13, it must be assembled onto a substrate with an unperforated braze particle preform 124 per step 122 of FIG. 13 to make a hybrid pre-fusion blank 150. FIG. 19 is an illustrated isometric view of the hybrid layered preform coating mat 120 from FIGS. 14-16 and an unperforated braze particle preform 124 applied to a tubular substrate 152 to manufacture the radial bearing in FIG. 12. The hybrid layered preform coating mat 120 is oriented such that the base layer perform 126 is adjacent to the cylindrical surface of the tubular substrate 152, and, in the case of a tubular substrate 152, the ends of the hybrid layered preform coating mat 120 meet up at its ends when wrapped around the tubular substrate 152. FIGS. 17 and 18 show that the perforated braze particle preform inlay 132 is positioned into the depression 134 in the depressed perforated hard particle preform 130. The hybrid layered preform coating mat 120 is positioned such that the depression 134 in the depressed perforated hard particle preform 130 is in the location and orientation where channels 114 (see FIG. 12) are desired in the channeled hardfacing wear protection 106 on the partially channeled hardfacing wear protection coating 102 when it is fused. The hybrid layered preform coating mat 120 can be adhered to the tubular substrate 152 with, but not limited to, adhesive.

Figure 20:
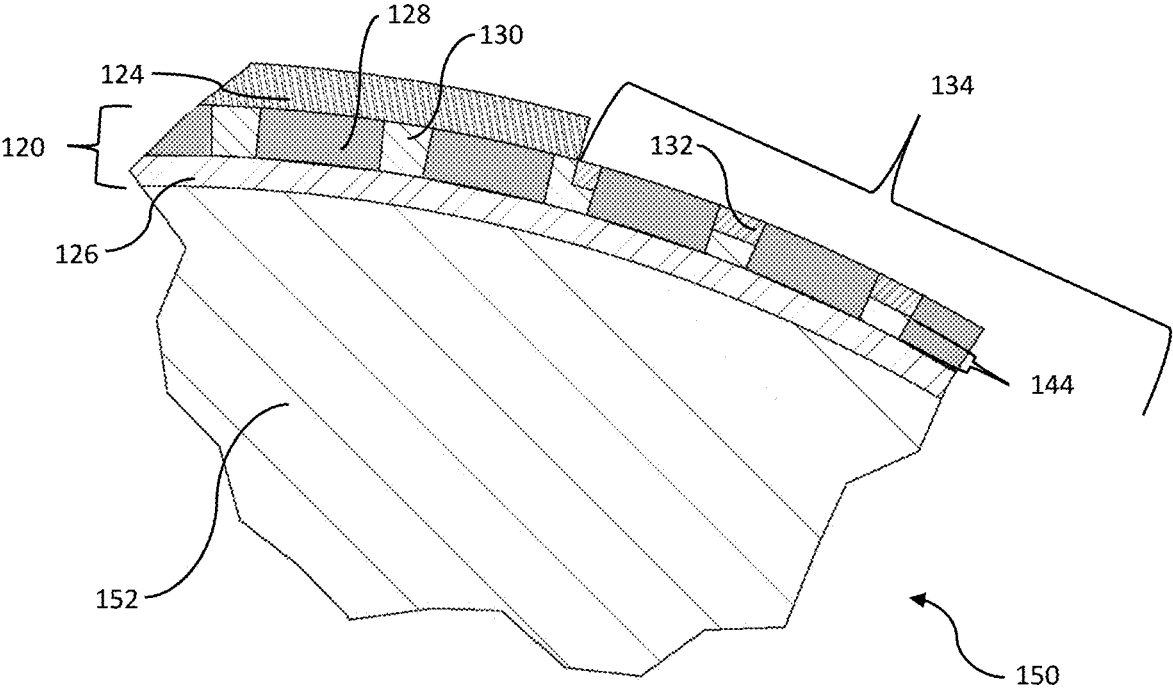
FIG. 20 is an illustrated detail view of a cross section of the hybrid pre-fusion blank of FIG. 19 at the perforated braze particle preform inlay showing the transition between the perforated braze particle preform inlay, hard elements, and depressed perforated hard particle preform, with the unperforated braze particle preform.

Next, as shown in FIGS. 19 and 20, unperforated braze particle preform 124 is applied over the top of the hybrid layered preform coating mat 120. In a preferred embodiment, the supplemental braze particle preform 124 is shaped and positioned such that it does not cover over the perforated braze particle preform inlay 132 as shown in FIG. 18. However, according to non-illustrated embodiments of this disclosure, a portion of the unperforated braze particle preform 124 can be applied over the perforated braze particle preform inlay 132 if the amount of braze in the perforated braze particle preform inlay 134 is not enough to fully and properly infiltrate and fuse the base layer preform 126, depressed perforated hard particle preform 130, and hard elements 128 in the depression 134.

FIG. 20 is an illustrated detail section view of the hybrid pre-fusion blank 150. The detail section view is taken perpendicular to the axis of the tubular substrate 152 midway through the perforated braze particle preform inlay 132 of the hybrid layered preform coating mat 120 and shows the cross section at the edge of a perforated braze particle preform inlay 132 and a depression 134 in the depressed perforated hard particle preform 130. The detail view shows the perforated braze particle preform inlay 132 in the depression 134 of the depressed perforated hard particle preform 130. The hard elements 128 are positioned in the perforations of the perforated braze particle preform inlay 132 and the depressed perforated hard particle preform 130. The base layer preform 126 is positioned under the depressed perforated hard particle preform 130 and hard elements 128 and is adjacent to the tubular substrate 152. Finally, the unperforated braze particle preform 124 is adhered over the surface of the hybrid layered preform coating mat 120.

Figure 21:
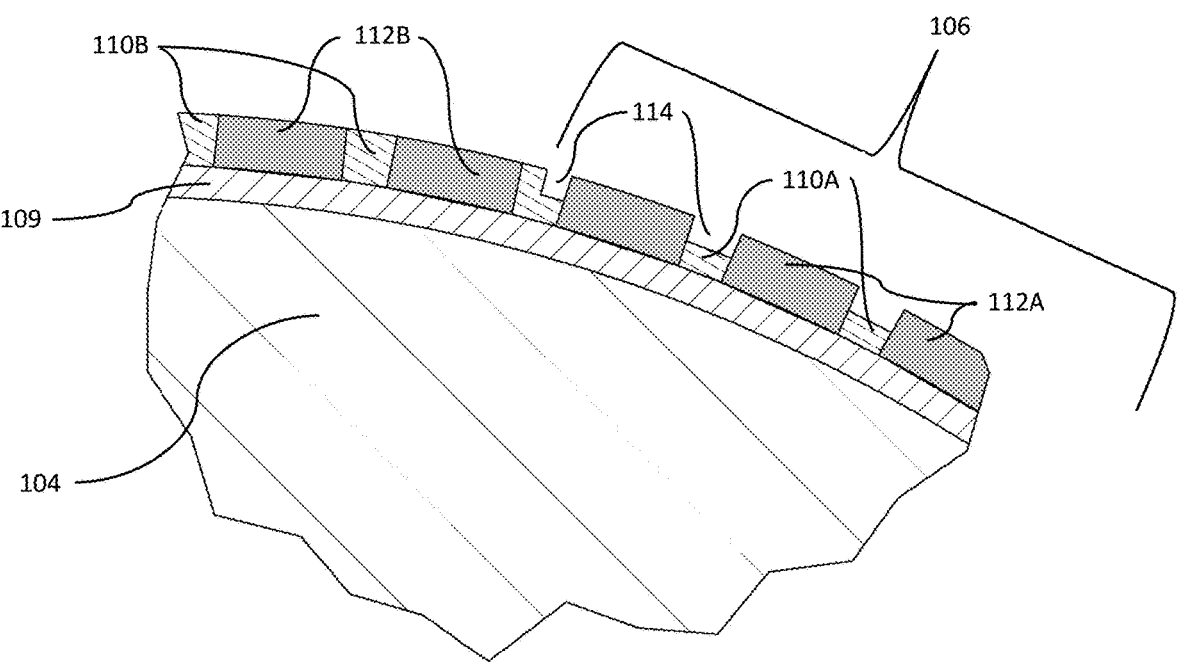
FIG. 21 is an illustrated detail section view of the cross section of the fused substrate of FIG. 12 in the same plane and location as the detail section view of FIG. 20, but after fusion has been completed.
Figure 22:
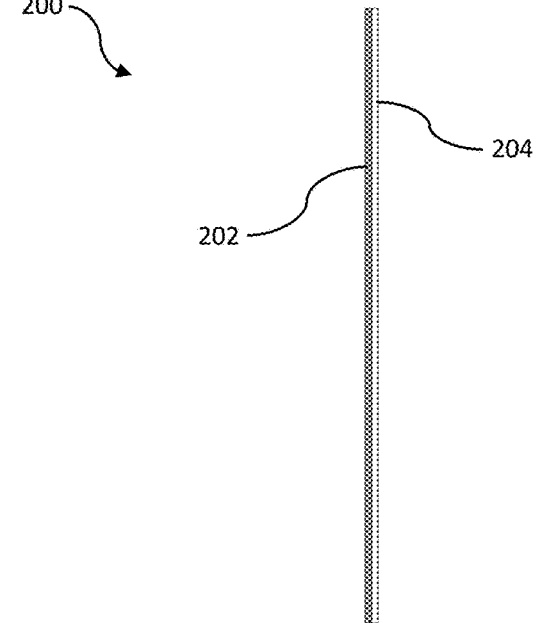
FIG. 22 is a side view of an embodiment of a multilayer preform.

The hybrid pre-fusion blank 150 is then processed per step 140 of FIG. 13, which is identical to step 46 of FIG. 2 and is described previously in this disclosure. The resulting article is a fused substrate 100 per FIG. 12 with a partially channeled hardfacing wear protection coating 102 having a channeled hardfacing wear protection 106 and unchanneled hardfacing wear protection 108. FIG. 21 is an illustrated detail section view of the cross section of a fused substrate 100 per FIG. 12. The detail section view is taken in the same plane and location as the detail section view of FIG. 20, but after fusion has been completed. Referring to FIGS. 20 and 21, during the fusion process, the base layer preform 126 has had the polymer burnt off and been infiltrated with the braze from the perforated braze particle preform inlay 132 and the unperforated braze particle preform 124 to form a fused base layer 109 that has fused with the fused hard elements 112A and 112B, the fused matrix composite 110A and 110B, and with the surface of the tubular substrate 104. The fine and/or ultrafine metallic particles from the base layer preform 126 may or may not have partially or fully alloyed with the braze depending on the alloy used for the base layer preform 126. The depressed perforated hard particle preform 130 has had the polymer burnt off and has also been infiltrated with braze from the perforated braze particle preform inlay 132 and the unperforated braze particle preform 124 to form a fused matrix composite 110A and 110B that has fused to the fused base layer 109 and to the sides of the hard elements 112A and 112B. The fused hard elements 112A and 112B and the fine and/or ultrafine hard particles from the depressed perforated hard particle preform 130 preferentially remain intact. The perforated braze particle preform inlay 132 and the unperforated braze particle preform 124 that existed on the hybrid pre-fusion blank 150 is now gone after having the polymer burnt off and the braze particles melted and infiltrated into the layers below. This results in the fused matrix composite 110A being recessed from the top of the fused hard elements 112A where the depression 134 was in the depressed perforated hard particle preform 130, which creates a channel 114 between the hard elements 112A when the perforated braze particle preform inlay 132 is melted away. Outside the area of the depression 134 in the depressed perforated hard particle preform 130 the fused matrix composite 110B is flush with the top of the fused hard elements 112B and no channels being formed when the unperforated braze particle preform 124 is melted away.

Those skilled in the art will understand that the ability to specifically place and orient channels in the hardfacing is defined by the placement of the depression 134 in the depressed perforated hard particle preform 130, and placement of the perforated braze particle preform inlay 132 in the depression 134 of the hybrid layered preform coating mat 120. This can be done with a single depression or multiple depressions which allows the creation of any channel pattern desired.

Those skilled in the art recognize that a number of methods can be used to create the required perforated patterns in the perforated hard particle preform 34, perforated braze particle preform 36, depressed perforated hard particle preform 130, and perforated braze particle preform inlay 132 to locate the hard elements 42, or hard elements 128 including, but not limited to, punching using punches, or cutting using a blade, a laser, or a water jet. Preferentially, creation of perforations in the perforated hard particle preform 34 and perforated braze particle preform 36, or depressed perforated hard particle preform 130, and perforated braze particle preform inlay 132 is performed after material for the preforms have been adhered together. FIG.

22 is a side view of one embodiment of an illustration of a multilayer preform 200. The multilayer preform 200 may be made up of a hard particle preform 202 and a braze particle preform 204. The hard particle preform 202 and the braze particle preform 204 are milled to their desired thicknesses and then are adhered together using an adhesive into multilayer preform 200. Perforating the multilayer preform 200 will result in matching perforations in both the hard particle preform 202 and the braze particle preform 204, simplifying the manufacturing process.

FIGS. 23A and 23B show a preferred method of manufacturing a perforated multilayer preform 206. FIG. 23A illustrates a top view of multilayer preform 200. Alternating cuts 208 are made through both the hard particle preform 202 and the braze particle preform 204 layers of multilayer preform 200 at the same time. The alternating cuts 208 are all the same length and are equally spaced within each column. Each column is evenly spaced and is offset from the column beside it such that the center of each cut aligns with the web between each alternating cut 208 in the next column. This alternating cut 208 pattern results in multilayer preform 200 that can be expanded and the alternating cuts 208 will spread open to create perforations. FIG. 23B illustrates the perforated multilayer preform 206 that has cavities 212 created by expanding the multilayer preform 200 from FIG. 23A. The cavities 212 have a stretched rhombus shape and a hard element 42 or hard element 128 may be manufactured to tightly fit the dimensions of the cavity 212 for use when using the perforated multilayer preform 206 in a layered preform coating mat 40 or a hybrid layered preform coating mat 120. This method simplifies the cutting of perforations in the perforated multilayer preform 206 and reduces the amount of waste that occurs.

Another method of perforating a multilayer preform 200 involves using punches to shear through the multilayer preform 200. In a preferred embodiment of a punch style method of perforating the multilayer preform 200, the hard elements 42 or hard elements 128 themselves can act as the punch to create the perforation in the multilayer preform 200 and result in the hard elements 42 or hard elements 128 positioned in the perforation in the same action. FIG. 24 shows an embodiment of a hard element 214 that includes raised edges 216 on its face 218 around its perimeter 220 that may be used for this method. The purpose of the raised edges 216 will become more evident in the descriptions for FIG. 25 and FIG. 26.

Figure 25:
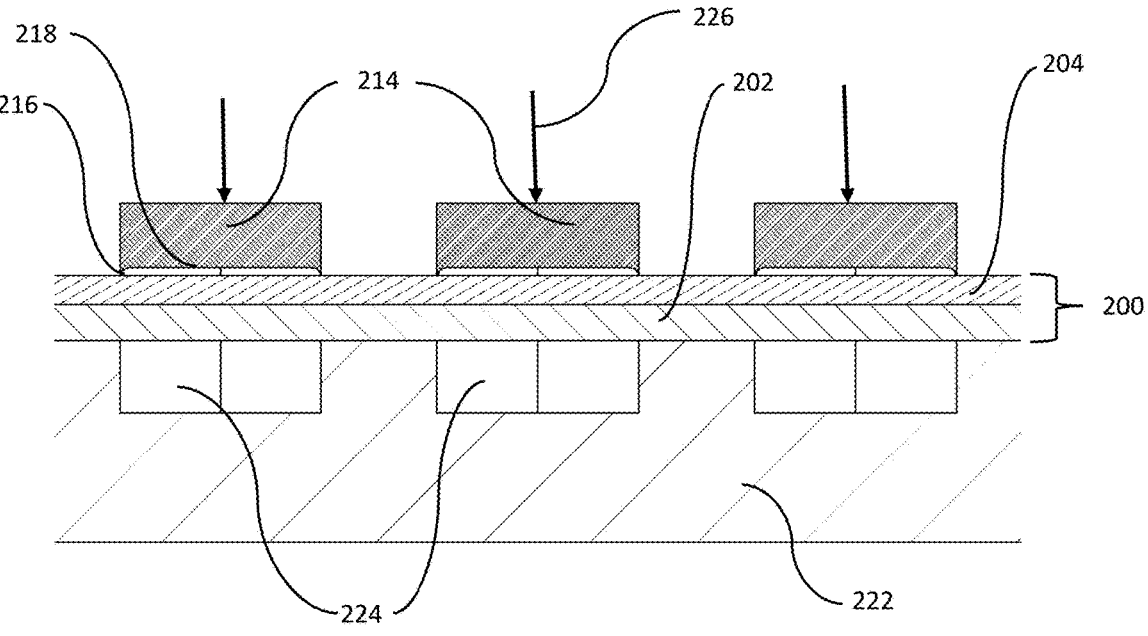
FIG. 25 is an illustration for a method of perforating a multilayer preform using hard elements as punches showing the hard elements prior to their punching through the multilayer preform.

FIG. 25 shows a cross sectional view of a method that uses hard elements 214 themselves to act as the punch to displace a matching profile of the multilayer preform 200 that may be made up of the hard particle preform 202 and the braze particle preform 204. The multilayer preform 200 is placed over a die plate 222 that has a series of receptacles 224, with each receptacle 224 closely matching the dimensions of the hard element 214 and the receptacles 224 arrayed in the desired pattern for the hard elements 214. The hard elements 214 are then placed over the multilayer preform 200 with the sharp edges 216 on their faces 218 oriented against the multilayer preform 200. The hard elements 214 are also positioned such that they are each located over a matching receptacle 224 in the die plate 222. Force 226 is then applied to each hard element 214 to push them down against the multilayer preform 200, shearing the multilayer preform 200 to the mating hard element 214 shape and resulting in the perforation of the multilayer preform 200.

Figure 26:
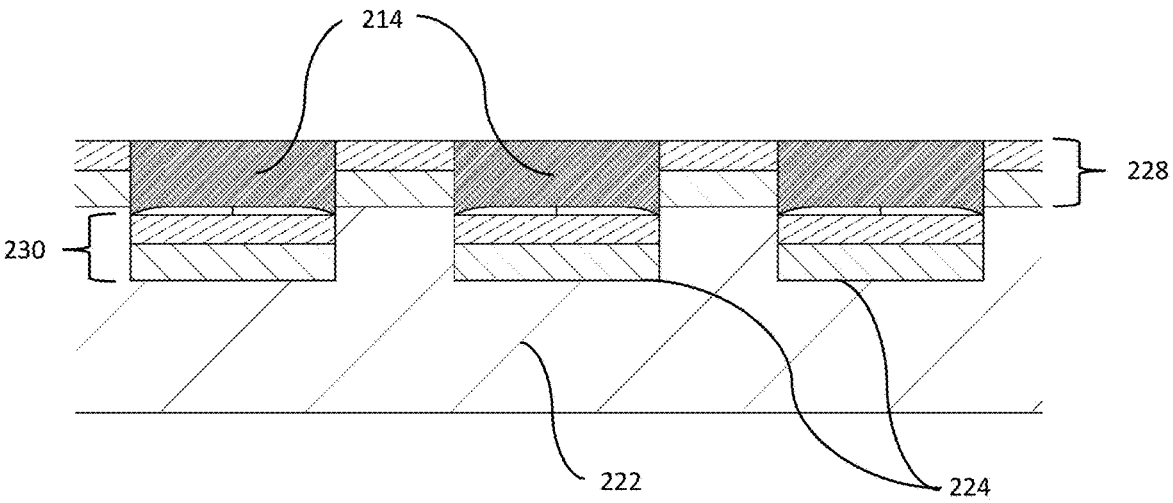
FIG. 26 is an illustration for a method of perforating a multilayer preform using hard elements as punches showing the hard elements after they have perforated the multilayer preform and positioned the hard elements in the perforations.

FIG. 26 shows a cross sectional view of the hard elements 214 pushed into the now perforated multilayer preform 228 and the displaced multilayer preform 230 pushed into the receptacles 224 in the die plate 222. The hard elements 214 and perforated multilayer preform 228 is then separated from the die plate 222 and can be used for assembly of the layered preform coating mat 40 or hybrid layered preform coating mat 120 as described previously. The displaced multilayer preforms 230 can be removed from the die plate 222 and be recycled. Pressing of the hard elements 214 into the multilayer preform 200 can be performed individually, or as multiples, and can use any various means including but not limited to, presses or rollers. The receptacles 224 in the die plate 222 may or may not also have raised edges around their perimeter to assist with the shearing of the multilayer preform 200. The hard elements 214 can be of any shape, including but not limited to, square, rectangular, round, oval, or a polygon. The hard elements 214 may have raised edges 216 on one or both faces 218 or may not have raised edges on either face. The hard elements 214 may or may not be positioned prior to pressing into the multilayer preform 200 using a template that matches the pattern on the die plate 222 to ensure aligned positioning of the hard elements 214 over the receptacles 224 in the die plate 222. The multilayer preform 200 may be oriented such that the braze particle preform 204 is adjacent to the hard elements 214 prior to their shearing through the multilayer preform 200 or the hard particle preform 202 may be adjacent to the hard elements 214 prior to their shearing through the multilayer preform 200.

Figure 27:
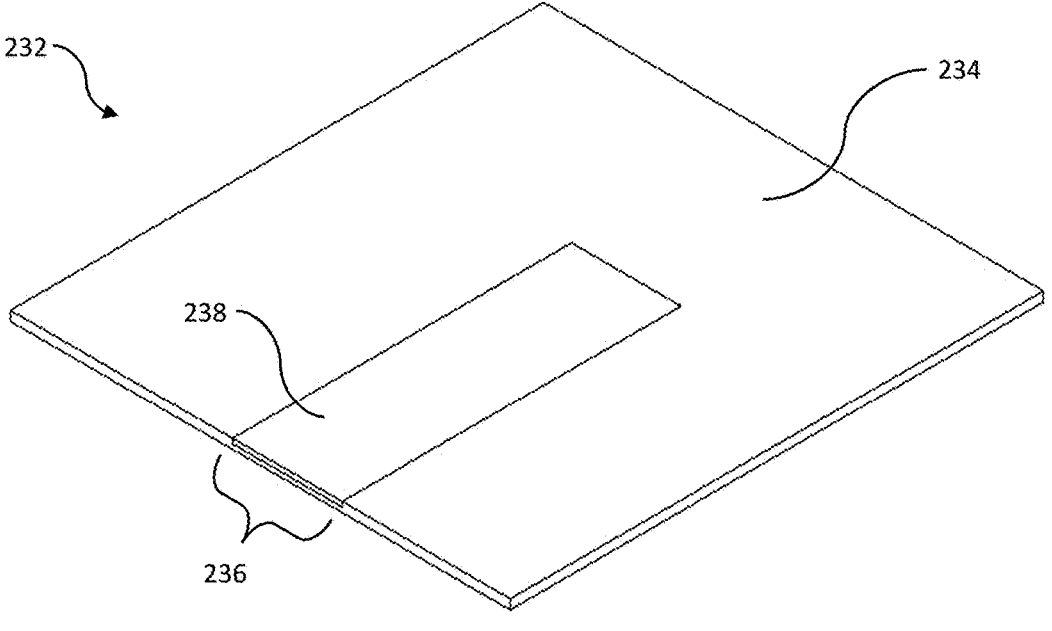
FIG. 27 is an illustrated isometric of an embodiment of a hybrid multilayer preform containing a braze particle preform inlay.

Those skilled in the art will recognize that each layer of the multilayer preform 200 does not have to cover the full extent of the layer. For example, the hybrid layered preform coating mat 120 uses a depressed perforated hard particle preform 130 with a perforated braze particle inlay 132 located in depression 134 in the depressed perforated hard particle preform 130. FIG. 27 illustrates a hybrid multilayer preform 232 that may be used to manufacture a combined depressed perforated hard particle preform 130 and perforated braze particle preform inlay 132 for the hybrid layered preform coating mat 120. The hybrid multilayer preform 232 has a depressed hard particle preform 234 that contains a depression 236 and the dimensions and location of the depression 236 correlates with where the channels 114 are desired in the partially channeled hard facing wear protection 102. The thickness of the depressed hard particle preform 234 in the depression 236 may be the same as the desired thickness of the matrix composite 110A in the channels 114 in the partially channeled hard facing wear protection 106. The thickness of the rest of the surface area of the depressed hard particle preform 234 is the same as the thickness of the hard elements 112. A braze particle preform inlay 238 is located in the depression 236 and has the same length and width dimensions as the depression 236. Though not required, in a preferred embodiment the braze particle preform inlay 238 is the same thickness as the depth of the depression 236, which results in the top of the braze particle preform inlay 238 even with the top of depressed hard particle preform 234. The hybrid multilayer preform 232 can be used for but not limited to any of the perforating methods described above. Those skilled in the art will recognize that multiple depressions 236 in the depressed hard particle preform 234 can be used to create the desired pattern for the channels 114 in the channeled hardfacing wear protection 106 of the partially channeled hardfacing wear protection 102.

There are several modifications to the process described above that can be made.

In various specific embodiments, the base layer preform 32 or base layer preform 126 may be constituted of fine and/or ultrafine alloy particles held together with a fibrillated polymer per the description above, but the base layer preform 32 or base layer preform 126 may also contain or have its constituents replaced with fine and/or ultrafine braze particles and/or fine and/or ultrafine ceramic particles and/or fine and/or ultrafine hard metal particles held together with a fibrillated polymer.

In various specific embodiments, the perforated hard particle preform 34 or depressed perforated hard particle preform 130 may be constituted of fine and/or ultrafine hard metal particles held together with a fibrillated polymer per the description above, but the perforated hard particle preform 34 or depressed perforated hard particle preform 130 may also contain or have its constituents replaced with fine and/or ultrafine alloy particles and/or fine and/or ultrafine ceramic or cermet particles held together with a fibrillated polymer.

In various specific embodiments, the hard elements 42, or hard elements 128 may be tungsten carbide tile, a polycrystalline diamond solid, or any other hard composite material of any shape.

Figure 28:
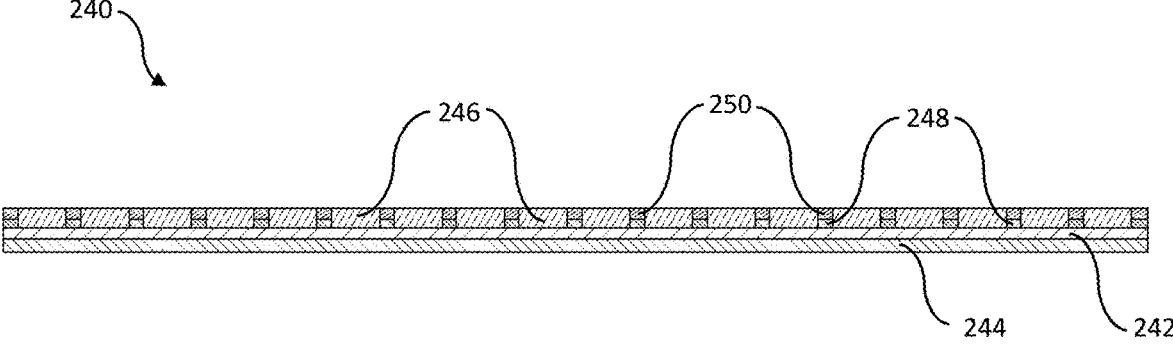
FIG. 28 is an illustrated section view in cross-section of another specific embodiment of a layered preform coating mat with the addition of another preform layer under the hard elements and perforated hard particle preform.

In various specific embodiments, the layered preform coating mat 40 or hybrid layered preform coating mat 120 may have other layers added in addition to the ones in the embodiments discussed above. As an example, an additional preform base layer could be added to provide a second transitional stress reducer in the finished coating. FIG. 28 is a section view of an embodiment of a layered preform coating mat 240 that has a second full base layer preform 242 of other hard particles or ceramic/metallic particles that could be introduced between the base layer preform 244 below it and the hard elements 246 and perforated hard particle preform 248 above it. The perforated braze particle preform 250 remains adjacent to the perforated hard particle preform 248. The addition of another preform layer does not affect the manufacturing processes described herein.

Conversely, to reduce the stresses in the finished coating, the tubular sleeve 14 may already have an initial coating layer applied to it that the layered preform coating mat would be placed over. Those skilled in the art will recognize that the stresses inherent in the coating materials can be excessively high and result in cracking of the coating if not mitigated. One method is to use transition layers in the coating to reduce the stresses between layers and eliminate the risk of cracking.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. For example, while the present inventions have been described in connection with a radial bearing, the present inventions are not so limited but instead are intended to encompass and/or by used in connection with any other composite articles. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

The invention claimed is:

1. A method of making a channeled composite article comprising:

creating a plurality of preforms including at least a base layer preform, a perforated hard particle preform including a plurality of cavities, and a perforated braze preform including a plurality of cavities corresponding to the cavities in the perforated hard particle preform;

assembling on a flat surface the base layer preform, the perforated hard particle preform, the perforated braze preform, and hard elements into a layered preform coating mat;

applying the layered preform coating mat to a substrate with the base layer preform of the layered preform coating mat disposed adjacent the substrate; and fusing the layered preform coating mat to the substrate with braze from the perforated braze preform, thereby decreasing the combined thickness of the perforated hard particle preform and the perforated braze preform and forming channels between the hard elements over at least a portion of the layered preform coating mat.

2. The method of claim 1, further including adding a nonperforated braze preform to the layered preform coating mat on top of the perforated braze preform before fusing the layered preform coating mat to the substrate.

3. The method of claim 1, wherein the plurality of cavities in the perforated hard particle preform are aligned with the plurality of cavities in the perforated braze preform, and the hard elements are positioned within the aligned cavities.

4. The method of claim 1, wherein upper surfaces of the hard elements are generally flush with an upper surface of the perforated braze preform before the layered preform coating mat is fused to the substrate.

5. The method of claim 1, wherein upper surfaces of the hard elements are generally projected above the upper surface of the perforated braze preform before the layered preform coating mat is fused to the substrate.

6. The method of claim 1, wherein upper surfaces of the hard elements are generally recessed below the upper sur-face of the perforated braze preform before the layered preform coating mat is fused to the substrate.

7. The method of claim 1, wherein the entire surface of the layered preform coating mat includes channels between the hard elements after the layered preformed coating mat is fused to the substrate.

8. The method of claim 1, wherein materials from the layered preform coating mat that are fused to the substrate consist of at least one of the hard elements, hard particles in the perforated hard particle preform, metallic particles, and ceramic particles.

9. The method of claim 1, wherein the layered preform coating mat is fused to the substrate with braze from the perforated braze preform using one of (a) a vacuum furnace, (b) vacuum induction heating, and (c) laser heating.

10. The method of claim 1, further including post fusion heat treating the substrate and fused layered preform coating mat.

11. The method of claim 1, wherein the composite article is a radial bearing.

12. The method of claim 1, wherein the hard elements are one of tungsten carbide tiles and polycrystalline diamond solid.

13. The method of claim 1, wherein the hard particle preform layer includes a plurality of the hard elements disposed in a pattern with a hard particle preform located between and partially filling the space around the hard elements to define a plurality of channels between the hard elements.

14. The method of claim 1, wherein the substrate is cylindrical.

15. The method of claim 1, wherein the base layer preform is formed of at least one of fine or ultrafine metallic particles, and fine or ultrafine ceramic or cermet particles, the particles being held together with a fibrillated polymer.

16. The method of claim 1, wherein creating the hard particle preform includes applying alternating cuts to a preform material, and expanding the cut preform material to form cavities to receive the hard elements.

17. The method of claim 1, wherein the layered preform coating mat further includes a second preform layer disposed between the base layer preform and the depressed hard particle preform layer.

* * * * *